United States Patent
Sakakura

(10) Patent No.: US 6,389,423 B1
(45) Date of Patent: May 14, 2002

(54) DATA SYNCHRONIZATION METHOD FOR MAINTAINING AND CONTROLLING A REPLICATED DATA

(75) Inventor: Takashi Sakakura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,229

(22) Filed: Dec. 3, 1999

(30) Foreign Application Priority Data

Apr. 13, 1999 (JP) .................................. 11-105885

(51) Int. Cl.⁷ .............................................. G06F 17/30
(52) U.S. Cl. ..................... 707/10; 707/203; 707/206; 455/432; 455/419; 455/435; 455/466; 455/556; 455/410; 455/517; 370/349; 340/870.2
(58) Field of Search ................................. 455/432, 419, 455/435, 466, 552, 410, 517; 370/349; 340/870.2; 707/10, 203, 206

(56) References Cited

U.S. PATENT DOCUMENTS

| | | | | |
|---|---|---|---|---|
| 5,513,210 A | * | 4/1996 | Vook et al. ................. | 375/202 |
| 5,539,666 A | * | 7/1996 | Kobayashi et al. ......... | 364/514 |
| 5,579,384 A | * | 11/1996 | Seymour ..................... | 379/243 |
| 5,594,740 A | * | 1/1997 | Christoph ................... | 455/410 |
| 5,594,943 A | * | 1/1997 | Kumar ........................ | 455/436 |
| 5,625,795 A | * | 4/1997 | Takashi ....................... | 711/148 |
| 5,745,704 A | * | 4/1998 | Yasukawa ............. | 395/200.08 |
| 5,761,526 A | * | 6/1998 | Takashi ......................... | 710/1 |
| 5,790,952 A | * | 8/1998 | Seazholtz et al. ........... | 455/432 |
| 5,894,573 A | * | 4/1999 | Toshihiko et al. .......... | 709/310 |
| 5,914,955 A | * | 6/1999 | Daane et al. ................ | 370/395 |

OTHER PUBLICATIONS

"Network–based cooperative TV program production system"; Sumiyoshi et al; Broadcasting, IEEE Transaction; vol. 42 3. pp. 229–236; Sep. 1996.*

* cited by examiner

Primary Examiner—Jean M. Corrielus

(57) ABSTRACT

The aim of the present invention is, as for a data communication among the nodes sharing, managing and maintaining the replicated data, to reduce the communication traffic by utilizing attributes of individual communication media. The application program of the node on the transmitting side inserts the data object into the data store, and the data synchronizer transmits an update message including the differential data and the log number. The node on the receiving side compares the log number of the update log data of its node and the log number of the update message it has received, and decides whether or not to adopt the update message.

12 Claims, 18 Drawing Sheets

Fig.18

| LOG NUMBER | UPDATE OPERATION | OBJECT | DIFFERENTIAL DATA ID |
|---|---|---|---|
| 00000008 | NEW INSERT | work-001a | diff00000008 |
| 1801 | 1802 | 1803 | 1804 |

Fig.19

| LOG NUMBER | UPDATE OPERATION | OBJECT | DIFFERENTIAL DATA |
|---|---|---|---|
| 00000008 | DECLARATION FOR SHARING | null | null |
| 1901 | 1902 | 1903 | 1904 |

Fig.20

| LOG NUMBER | UPDATE OPERATION | OBJECT | DIFFERENTIAL DATA |
|---|---|---|---|
| ffffffff | COMMENCE UPDATE | work-001a | null |
| 2001 | 2002 | 2003 | 2004 |

Fig.21

| LOG NUMBER | UPDATE OPERATION | OBJECT | DIFFERENTIAL DATA |
|---|---|---|---|
| ffffffff | UPDATE | work-001a | " update xxxx xxxxx xxxxx " |
| 2101 | 2102 | 2103 | 2104 |

Fig.22

| LOG NUMBER | UPDATE OPERATION | OBJECT | DIFFERENTIAL DATA |
|---|---|---|---|
| ffffffff | RELEASE DECLARATION FOR SHARING | null | null |
| 2201 | 2202 | 2203 | 2204 |

DATA SYNCHRONIZATION METHOD FOR MAINTAINING AND CONTROLLING A REPLICATED DATA

BACKGROUND OF THE INVENTION

1. Field of the Invention

As for a data controlling method permitting a plurality of computers to share a data and to maintain copies of a shared data individually, the present invention relates to a data synchronization method for maintaining a consistency of the shared data among the plurality of computers.

2. Description of the Related Art

With the development of various types of mobile communication networks and general public networks accompanied by the dissemination of mobile information terminals, various mobile information terminal services can now be supplied. On one hand, an internet is also becoming popular. For this reason, needs such as "wanting to access the data of intranet through the internet" and "wanting to use a WEB service being supplied at the internet" from the mobile information terminals are emerging.

Use of the internet does not involve a cost of using the backbone. The data transfer using the internet is relatively stable. As well, the internet has a potential for a massive data transfer. On contrary, the data transfer using the public networks or the mobile communication networks are rather costly. Especially, the mobile communication networks have disadvantages such as potential for amount of data transfer is small, cutoff of the lines are frequent, and communication is comparatively high-priced.

In order to maintain the consistency of file data copies at a communication environment of high cost and limited potential in the data transferring, a technique disclosed in Japanese unexamined patent publication HEI9-244936 attempts to reduce a data communication traffic by exchanging only a difference generated by a data update.

A communication protocol known as TCP/IP is commonly being used at the internet. The TCP/IP is known as a connection type communication protocol. It configures a communication session between two nodes communicating with one another, and provides a highly reliable communication means. The disclosed technique also adopts the TCP/IP in its communication for maintaining the data consistency. Although the reliability of the communication improves by using the connection type communication protocol, however, use of the connection type communication protocol is disadvantaged that the communication would be limited to a pre-decided pair of two nodes.

The method of maintaining the data consistency by using the connection type communication protocol also has a disadvantage that the communication traffic increases in accordance with the increase in the number of data nodes should be synchronized. If there are more than three nodes even in the same subnet, the communication traffic multiplies based on the number of data synchronization line. Accordingly, this method has a disadvantage that the time taken in the data synchronization is increased as a whole, because of an exclusive use of the network.

The present invention, which relates to a data synchronization method for maintaining and controlling a replicated data, for example aims to supply a data synchronization method which reduces an increase in the communication traffic in comparison with an increase in the number of nodes where the data should be synchronized.

SUMMARY OF THE INVENTION

A data communication device of the present invention is the data communication device connected to a communication mechanism which connects to another data communication device, comprising:

a shared data storing unit for storing a shared data replicated and managed by the data communication device and the another data communication device;

a shared data updating unit for updating the shared data stored in the shared data storing unit;

a version managing unit for storing and managing a version of the shared data;

a version communication unit for communicating the version of the shared data by using the communication mechanism;

an update data communication unit for communicating a update data which is a differential data between the shared data before updating and the shared data after updating by using the communication mechanism;

wherein the data communication device executes a plurality of processes as a transmitting side data communication device when the shared data updating unit updates the shared data stored in the shared data storing unit (case (1)), the plurality of processes includes a process A by the version managing unit, for creating the version of the shared data updated by the shared data updating unit and storing the created version;

a process B by the version communication unit, for transmitting the version stored in the version managing unit; and a process C by the update data communication unit, for transmitting the update data which is a differential data between the shared data before updating and the shared data after updating;

wherein the data communication device executes a plurality of processes as a receiving side data communication device when the another data communication device updates the shared data stored in the another data communication device (case (2)), the plurality of processes includes:

a process D by the version communication unit, for receiving the version transmitted from the another data communication device;

a process E by the update data communication unit, for receiving the update data transmitted from the another data communication device;

a process F by the version managing unit, for deciding whether to apply the update data based on the version stored in the version managing unit and the version received by the version communication unit, and for storing the received version when the version managing unit decides to apply the update data;

a process G by the shared data storing unit, for storing the update received data when the version managing unit decides to apply the update data.

The data communication device of the present invention executes a process H by the version communication unit, for transmitting the version stored in the version managing unit, in the case (2), in addition to the processes of D to G, as the receiving side data communication device, the data communication device executes a process I by the version communication unit, for receiving the version of the shared data transmitted by the another data communication device, and a process J by the version managing unit for storing the version of the shared data received by the version communication unit with an identification information of the another data communication device, in the case (1), in addition to the process of A to C, as the transmitting side data communication device.

The data communication device of the present invention stores identification information of the another data communication device and identifies the another data communication device by the stored identification information, wherein the version communication unit as a part of the transmitting side data communication device transmits the created version to the identified another data communication device in the process B when the shared data updating unit updates the shared data stored in the shared data storing unit in the case (1), and wherein the update data communication unit as a part of the transmitting side data communication device transmits the update data to the identified another data communication device in the process C when the shared data updating unit updates the shared data stored in the shared data storing unit in the case (1).

The version communication unit as a part of the receiving side data communication device intercepts the version transmitted from the another data communication device in the process D when the another data communication device updates the shared data stored in the another data communication device in the case (2), and the update data communication unit as a part of the receiving side data communication device intercepts the update data transmitted from the another data communication device in the process E when the another data communication device updates the shared data stored in the another data communication device in the case (2).

The data communication device of the present invention further comprising a mode controlling unit for switching to a mode of declaring data sharing and a data update commencement message communication unit for communicating a message for commencing data update by using the communication mechanism, wherein the data update commencement message communication unit as a part of the receiving side communication device executes a process of transmitting the message for commencing data update when the shared data updating unit updates the shared data stored in the shared data storing unit in the mode of declaring data sharing, wherein the version managing unit omits the process A of creating the version of the shared data updated by the shared data updating unit and storing the created version and the version communicating unit omits the process B of transmitting the version stored in the version stored in the version managing unit when the shared data updating unit updates the shared data stored in the shared data storing unit in the mode of declaring data sharing in the case (1), wherein the shared data updating unit as a part of the receiving side communication device by itself stops updating the shared data stored in the shared data storing unit when the data update commencement message communication unit receives the message for commencing data update in the mode of declaring data sharing, wherein the version communication unit omits the process D of receiving the version transmitted from the another data communication device and the version managing unit omits the process F of deciding whether to apply the update data and storing the received version when the another data communication device updates the shared data stored in the another data communication device in the mode of declaring data sharing in the case (2), wherein in the process G the shared data storing unit all the time stores the update data received when the another data communication device updates the shared data stored in the another data communication device in the mode of declaring data sharing in the case (2), and wherein the version managing unit creates the version of the shared data updated and stores the created version when the mode controlling unit releases the mode of declaring data sharing.

The data communication device of the invention further comprising a mode controlling unit for switching to a mode of declaring data sharing and a data update commencement message communication unit for communicating a message for commencing data update by using the communication mechanism, wherein the shared data updating unit as a part of the receiving side communication device by itself stops updating the shared data stored in the shared data storing unit when the data update commencement message communication unit receives the message for commencing data update outside the mode of declaring data sharing and, wherein the processes of D to G are not implemented when the another communication device updates the shared data stored in the another data communication device outside the mode of declaring data sharing.

The communication mechanism connecting a plurality of other data communication devices have a multicast communication function, the data communication device stores a identification information of the plurality of other data communication devices and identifies the plurality of other data communication devices by the stored identification information, the version communication unit as a part of the transmitting side data communication device transmits in multicast the created version to the plurality of identified other data communication devices in the process B when the shared data updating unit updates the shared data stored in the shared data storing unit, the update data communication unit as a part of the transmitting side data communication device transmits in multicast the created update data to the plurality of identified other data communication devices in the process C when the shared data updating unit updates the shared data stored in the shared data storing unit, the version communication unit receives the version of the shared data transmitted from the plurality of identified other data communication devices, and the version managing unit stores the version of the shared data received by the version communication unit with the identification information of the plurality of other data communication devices which transmit the version.

The data communication device of the present invention further comprising a media access control unit for confirming no data received during a pre-determined time, wherein the version communication unit as a part of transmitting side data communication device transmits in multicast the created version to the plurality of identified other data communication devices after the media access control unit confirming no data received during the predetermined time in the process B when the shared data updating unit updates the shared data stored in the shared data storing unit in the case (1), and wherein the update data communication unit as a part of the transmitting side data communication device transmits in multicast the update data to the plurality of identified other data communication devices after the media access control unit confirming no data received during the predetermined time in the process C when the shared data updating unit of one data communication device updates the shared data stored in the shared data storing unit in the case (1).

The communication mechanism connecting a plurality of other data communication devices have a multicast communication function, the data communication device stores identification information of the plurality of other data communication devices and identifies the plurality of other data communication devices by the stored identification information, and the data communication device further executes;
- a process K by the version communication unit, for transmitting in multicast the version stored in the version managing unit to the plurality of identified other communication devices; and
- a process L by the update data communication unit, for transmitting in multicast the updated data stored in the shared data storing unit to the plurality of identified other communication devices.

The communication mechanism includes more than two types of communication mechanisms, the version communication unit can communicate the version of the shared data by using either one of more than two types of communication mechanisms, and the update data communicating unit can communicate the update data by using either one of more than two types of communication mechanisms.

The version communication unit and the update data communication unit selects a pre-determined communication mechanism, and communicate by using the selected communication mechanism.

The mode controlling unit switches to a mode of declaring data sharing by linking with the another data communication device prior to the processes of the receiving side data communication device even if the another data communication device updates the data stored in the another data communication device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 18 illustrates an example of entry of the update log data;

FIG. 19 illustrates an example of message of declaring data sharing;

FIG. 20 illustrates an example of the data update commencement message;

FIG. 21 illustrates an example of differential data; and

FIG. 22 illustrates the message of releasing the mode of declaring the data sharing.

DETAILED DESCRIPTION OF THE PREFERRED EMBODIMENTS

Figure 1:
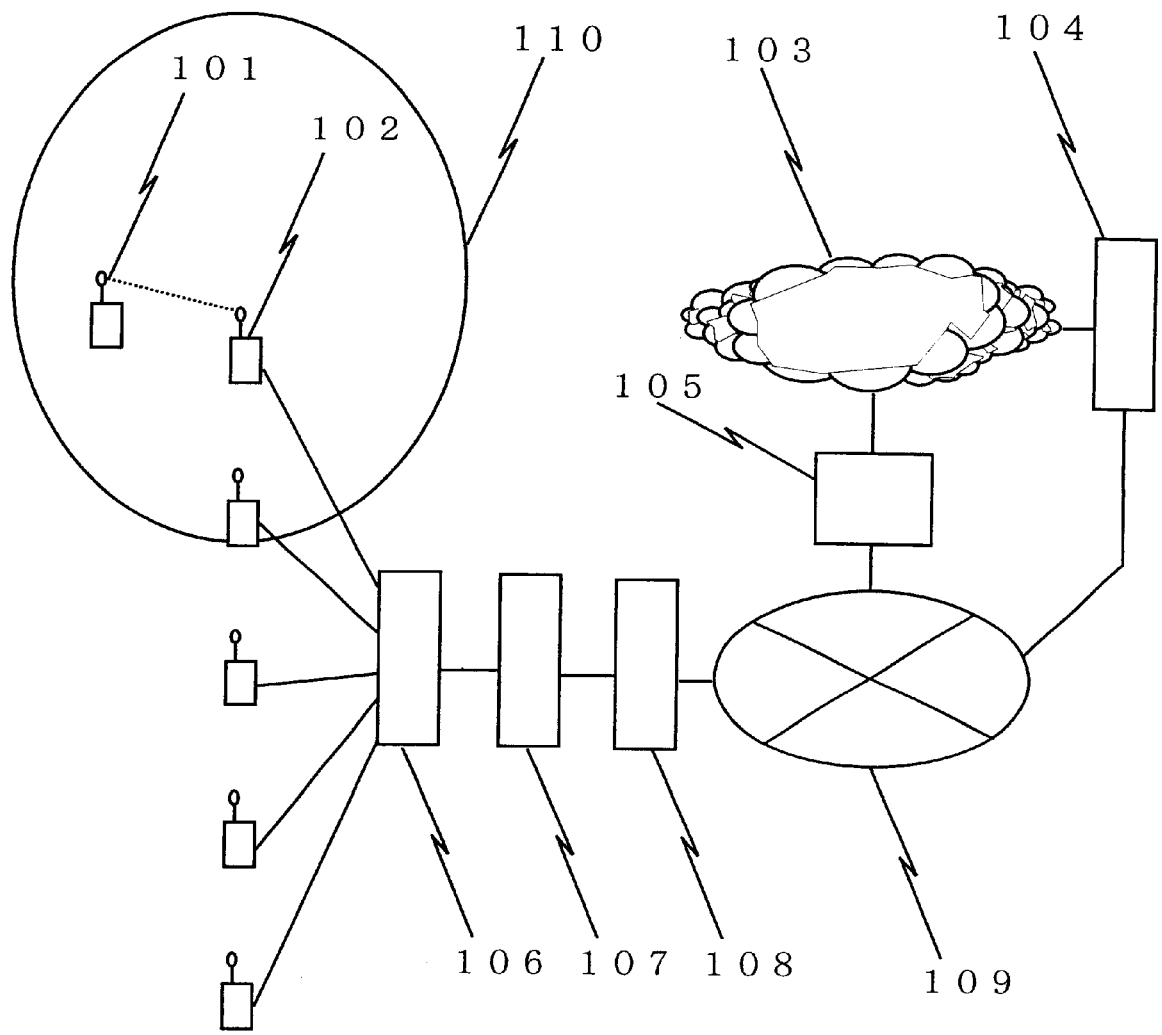
FIG. 1 illustrates a network system of the present invention.

Reference will now be made in detail to the present preferred embodiments of the invention, examples of which are illustrated in the accompanying drawings, wherein like reference numerals indicate like elements throughout the several views.

Embodiments

The present invention is described with reference to the embodiments shown in the attached drawings.

Embodiment 1.

The drawing of FIG. 1 illustrates a configuration of network system for the present invention.

The description of reference numerals indicated in FIG. 1 follows: a mobile terminal 101 inside a cell 110; base stations 102; an internet 103; a server 104 for supplying services; a gateway 105; a base station controller 106; a base station exchange 107; a general public network exchange 108; a general public line 109; and the cell 110 which is serviced by the base station 102.

The network system of the present invention comprises the internet 103, the general public line 109, and a mobile communication network. The mobile communication network includes the base stations 102; the base station controller 106; and the base station exchange 107. Although this is not illustrated in the drawing, a wired or wireless LAN (Local Area Network) which is independent from these general networks may also be included in the present invention.

The internet 103 is connected to the general public line 109 through the gateway 105. The server 104 is connected to the internet 103 and the general public line 109 with a modem.

Figure 2:
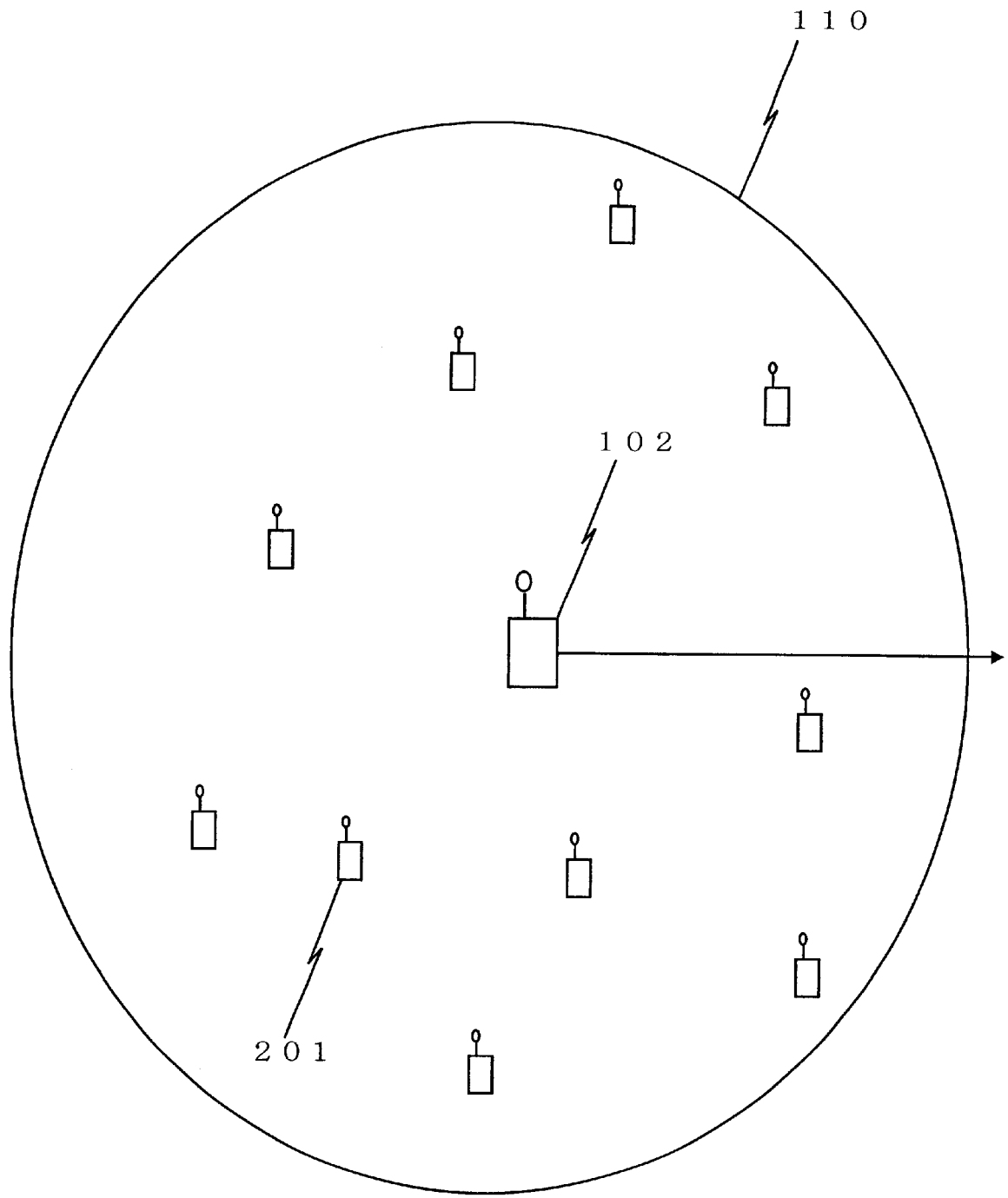
FIG. 2 illustrates a status inside a cell.

The drawing of FIG. 2 illustrates a status inside the cell 110. Mobile terminals 201, which are equivalent to the mobile terminals 101, are present inside the cell 110. These mobile terminals 201 inside the cell 110 can be connected to the general public line 109.

This network configuration comprising of the cell and the mobile terminals is classified as a broadcasting type communication media which is common in a wireless media. The broadcasting type communication media includes an infrared outer interface, a wireless LAN, and a Bluetooth which is receiving much attention as a communication media among the information communication devices. Further, the broadcasting type communication media includes a bus type communication media such as Ethernet.

As regard to the broadcasting type communication media, all the nodes sharing the media are equal. Such that all of the nodes can physically transmit their data to the media on demand. Also, the data transmitted from a certain node to the media can be observed by all of the nodes. However, in order to avoid a conflict of a plurality of data transmissions within the same media, a procedure to access a media, which is known as MAC (medium access control) is being defined, by taking the attributes of the media into account.

The mobile terminal 101 of the present embodiment is provided with the following communication devices: the wireless LAN; a CDMA; and the modem for connecting to the general public network. However, the present invention is not limited to these media. The present invention should be adopted to any media that can guarantee an exclusive access to the media by the medium access control and any media where all of the nodes can monitor and obtain the data in the media. Other examples of the media that can be adopted by the present invention are GSM (global system for mobile communication) which is widespread in various nations of Europe and Asia, and CDPD (cellular digital packet data) which is widespread in the U.S. As for the GSM, it is provided with the conditions required for adopting to the present invention which are: securing of a shared slot among nodes by using the TDMA method (time division multiple access); fixing the slot; and specifying a data-encrypting key. As for the CDPD, a transmission from a terminal in one cell is always limited to one, therefore, the present invention can also be applied.

Figure 3:
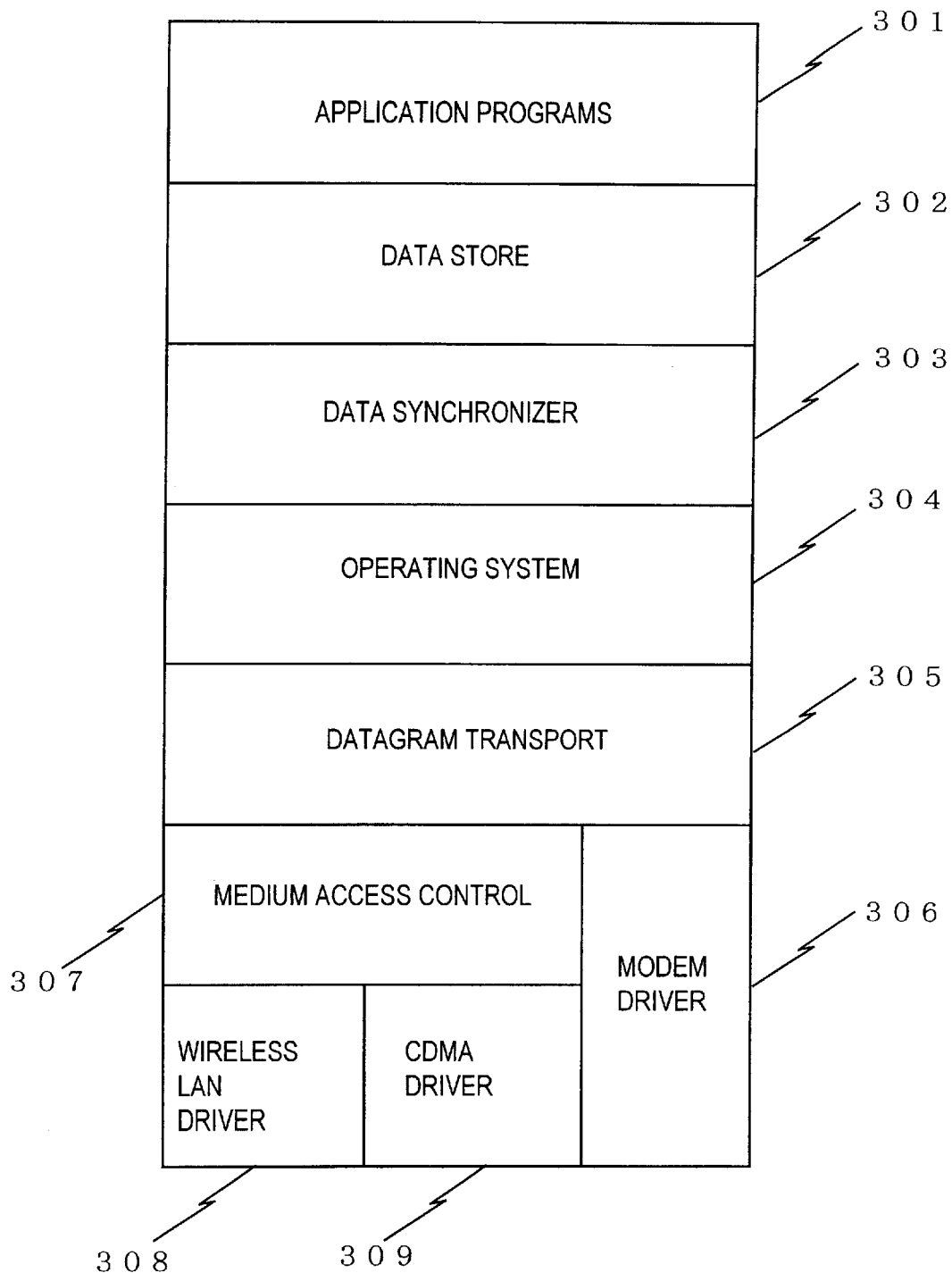
FIG. 3 illustrates a software configuration of mobile terminal.

The drawing of FIG. 3 illustrates a software configuration of the mobile terminal for the embodiment 1.

The description of reference numerals in FIG. 3 follows: an application program 301; a data store 302; a data synchronizer 303; an operating system 304; a datagram transport 305; a modem driver 306; a medium access control 307; a wireless LAN driver 308; and a CDMA driver 309.

Each one of the following communication devices: namely; the wireless LAN, the CDMA, and the modem, is provided respectively with the wireless LAN driver 308, the CDMA driver 309, and the modem driver 306. The media access control 307 of the mobile terminal controls the broadcasting type media to support the hardware function. The datagram transport 305 controls a communication port related to the application program 301. The data store 302 manages a replicated data to be shared. The application program 301 uses and controls the data in the data store 302, and supplies service to the user.

Firstly, the data synchronization method will be described, in which the server 104 and the mobile terminal 101 replicate and share the data through the general public line by using a modem, in order to give an example of the data synchronization method where two nodes replicate the data and share the data replicated.

Later, another example of the data synchronization method expanding reticulately from one to one synchronization is described, in which more than three nodes replicate and share the data.

Figure 4:
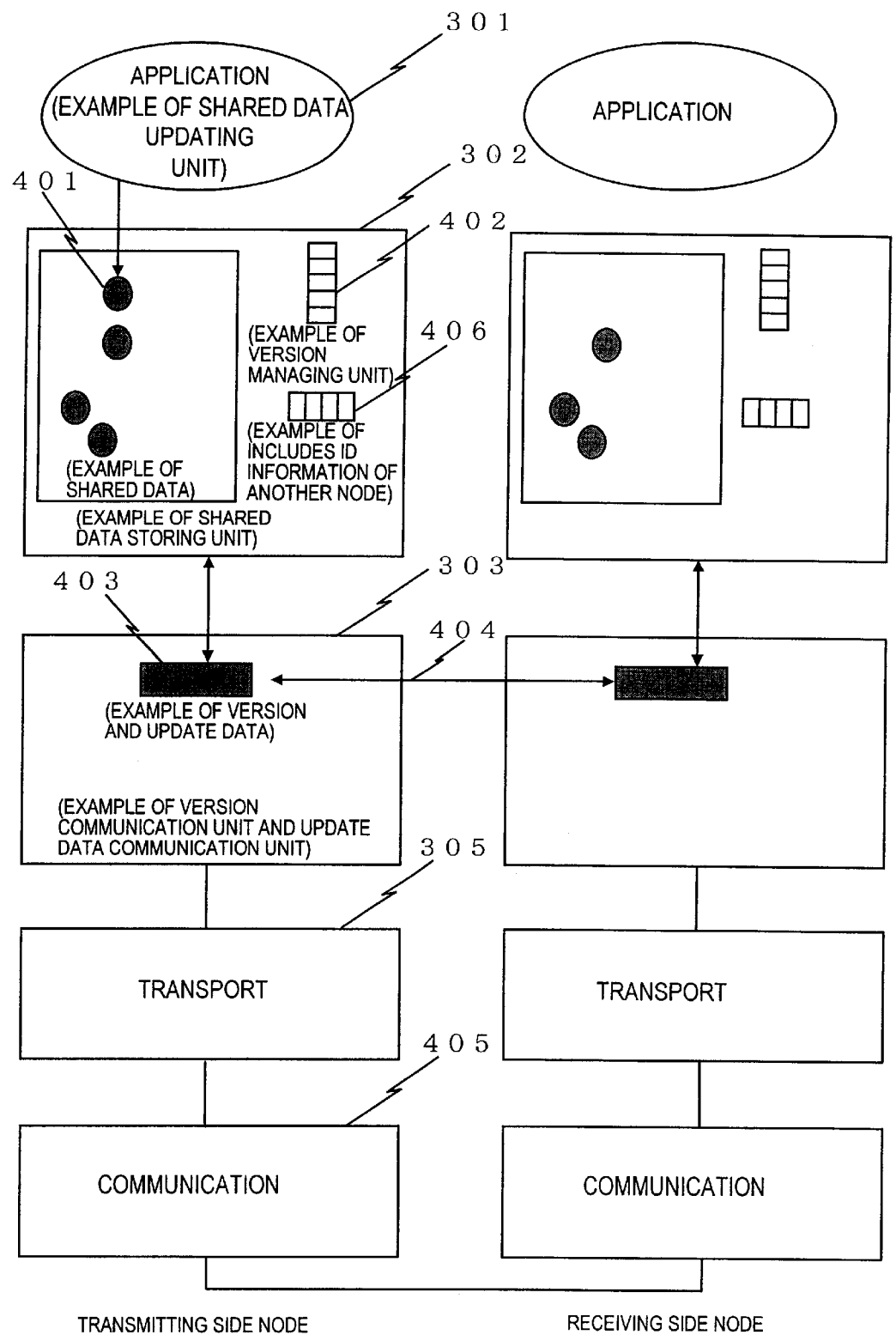
FIG. 4 illustrates a typical operation of data synchronization.

The drawing of FIG. 4 illustrates a typical operation of the data synchronization process. In this example, the application program 301 at each node updates the shared data managed at each node and maintains the consistency of the shared data.

The node shown on the left hand side of the drawing of FIG. 4 is a node which updates its data and transmits a data synchronization request. The node on the right hand side is a node which receives the data synchronization request and updates a shared data. In this example, the node on the left hand side is regarded as the mobile terminal, and the node on the right hand side is regarded as the server. However, it should be noted that there is no difference between each node as far as the data synchronization mechanism is concerned, and all nodes are basically the same, therefore, the data synchronization can likewise be requested from the node of the right hand side to the node of the left hand side.

The reference numerals 301, 302, 303 and 305 shown in FIG. 4 is same as those mentioned in FIG. 3. The description of reference numerals indicated in FIG. 4 follows: data objects 401; an update log data 402; an update message 403; a logic path 404; a communication mechanism 405; and a table 406 for managing the data store which replicates the shared data.

The application program 301 of the left hand side of the drawing is configured to control the processes of data updating and transmitting the data synchronization request. The application program 301 is configured to perform data update operation such as insert, update and delete of the data, by inserting a new data object 401 into the data store 302. The application program 301 is designed so that a new entry is added to the update log data 402 inside the data store 302 when the data update operation is executed. In the entry of the table 406 for managing the data store 302 which replicates the shared data, followings are stored: a node name; a data store name; and an applied version of the node.

The drawing of FIG. 18 illustrates examples of update log data entries.

The description of reference numerals indicated in FIG. 18 follows: a log number (version) 1801; a type of data update operation 1802; an update object 1803; and a differential data ID 1804.

The log number 1801 corresponds to an unit of the data store 302, and is incremented every time the data store 302 is updated. In the present embodiment, a version is managed by using a simple incremental counter using the log number 1801, however, a highly-accurate version managing method such as timestamp can alternatively be used.

The type of data update operation 1802 describes a content of the update operation. The object 1803 describes an update object for the data update operation. The differential data ID 1804 describes an ID of the differential data.

Further, the application program 301 is configured to deal with the data synchronization request. The data synchronizer 303, which is requested via the data store 302 to execute a data synchronization process, inquires to the data store 302 for a difference between the data which is going to be updated(by the node of the left hand side) and the data obtained at the time of the last data synchronization made by the node of the left hand side in relation to the node of the right hand side. Then, the data synchronizer 303 is configured to create the update message 403 by streaming the update log and the differential data obtained by the inquiring.

The data synchronizer 303 is configured, after the update message 403 is created, to create a datagram packet by using the data transport 305 and to transmit the datagram packet created to the known port for the data synchronization in the other node by using the communication mechanism 405. In such cases, the data synchronizer 303 is concerned only with an interface of the datagram transport 305, and it does not have to rely on the communication mechanism 405. In other words, no matter how the communication mechanism 405 has been implemented, the communication mechanism 405 operates transparently thus is independent from the datagram transport 305. In theory, the communication mechanism 405 communicates using a path 404 illustrated in the drawing of FIG. 4. The other node(the node on the right hand side in the drawing) is configured to wait for an arrival of the update message 403, check a log number of the update message 403 it has received, and update its own data store 302.

Figure 5:
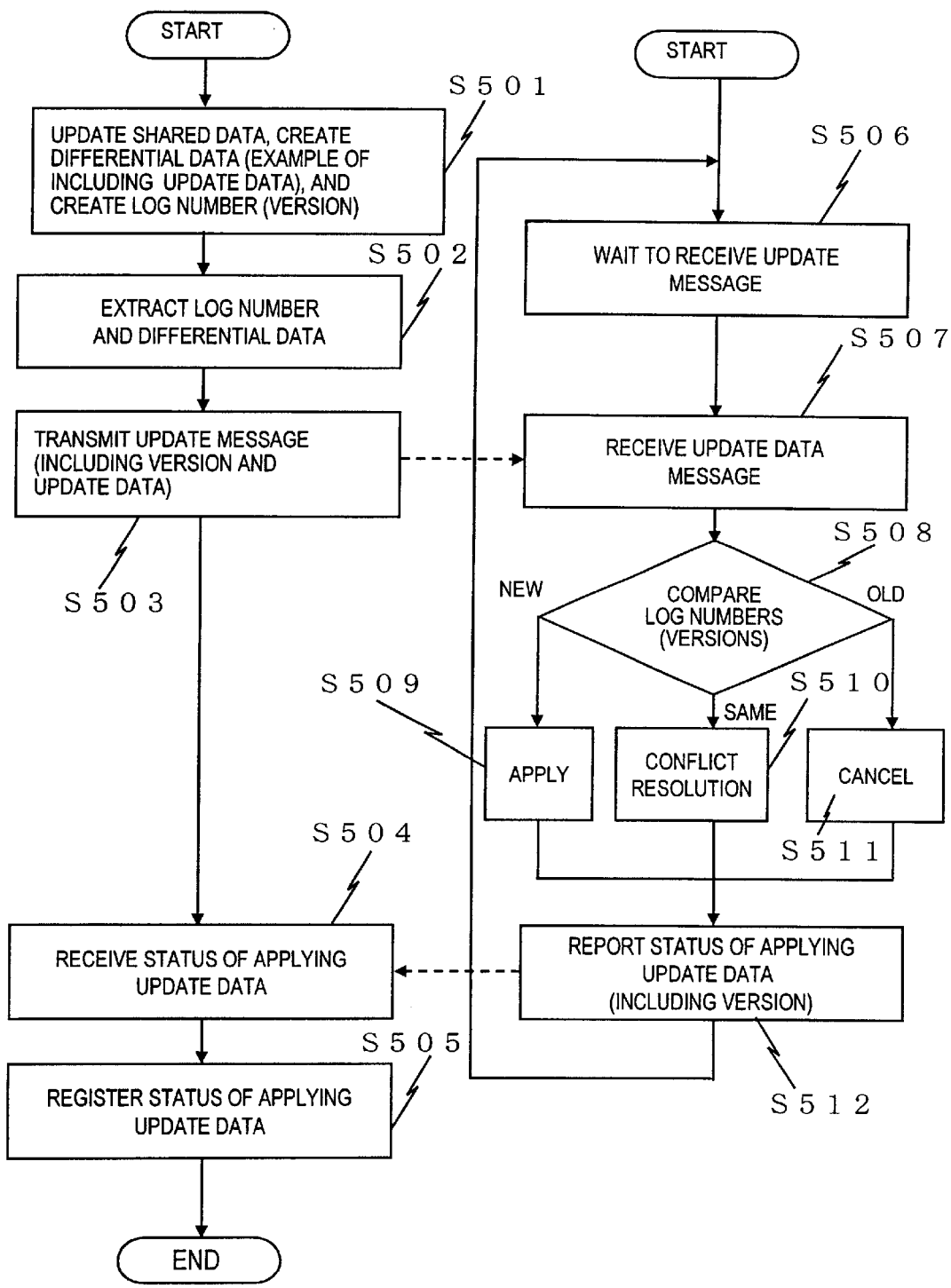
FIG. 5 illustrates a flow chart of the data synchronization.

A process of the data synchronization is described. The drawing of FIG. 5 illustrates a flow chart of the data synchronization process. A process context of the left hand side is a process context of the node on the left hand side of FIG. 4 which performs the data updating and the data synchronization request. The process context of right hand side is a process context of the node on the right hand side of FIG. 4 which waits for the arrival of data synchronization request and perform update of the shared data. Each node prepares the waiting context by the amount of communication media types it is going to use.

The application program 301 of the node which generates a data synchronization request updates the data and creates a log number and a differential data in step S501. Next in step S502, the update message 403 is created from the log number and the differential data, and in step S503 the update message 403 is transmitted to the other node.

In step S506, the node which receives the data synchronization request waits for the update message 403. When the update message 403 is received in step S507, then in step S508 a log number of the update message 403 is compared with a log number of the update log data 402 of the data store.

As a result of the comparison, if the log number of the received update message 403 is greater than the most recent log number stored in the receiving node, or in other words, if the update message 403 is newer, then in step S509 the shared data is updated based on the differential data in the update message 403. If the log numbers happen to be same, that is if the data updating conflicts, then in step S510, the node entrusts the selection of update data to the application and merges the updated result. If the log number of the received update message 403 happens to be smaller than the most recent log number stored in the receiving node, or in other words, if the update message 403 is older, then in step S511 the shared data is not updated and the update message is cancelled.

In step S512, it is reported to the node which is requesting for the data synchronization, that a result of handling the update message 403 as described previously, in other words, the status how the update data is applied (an status of applying update data).

The node which is requesting for the data synchronization receives the status of applying update data in step S504, in step S505 reads the log number included in the status of applying update data, and registers this log number together with an information which specifies the other node. Due to this, unless some kind of error such as loss of data is occurring, the data consistency can be maintained by exchanging the latest differential data, even with the data synchronization request from either sides.

The previously described example has illustrated an example of performing data synchronization of the replicated shared data between the nodes, one to one. In this example, with regard to the data synchronization, each node is completely in symmetrical relation. Accordingly, the data synchronization of the shared data among more than three nodes can be performed by adopting the previously described one to one node relation to a reticular node relations.

Figure 6:
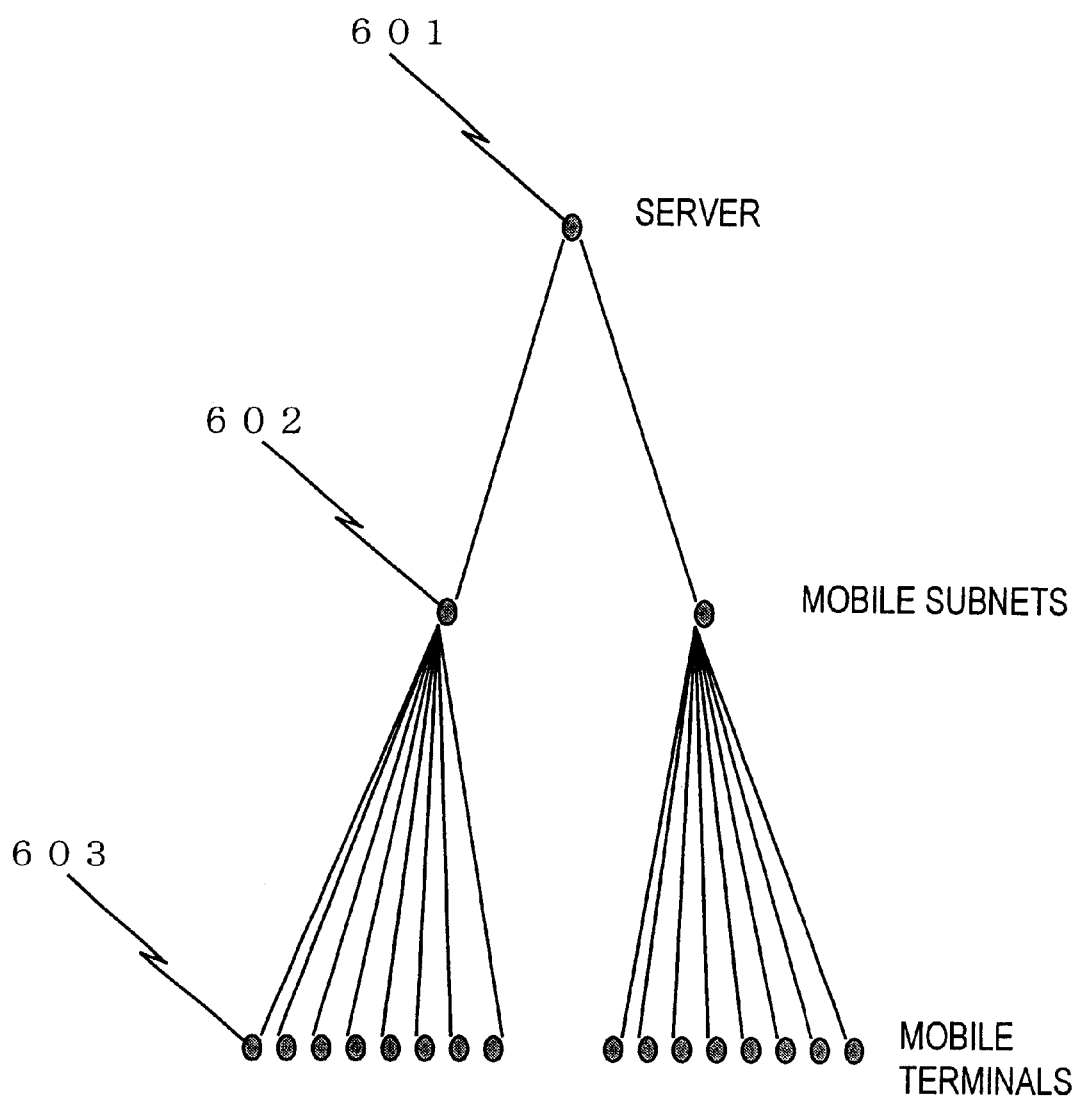
FIG. 6 illustrates an example defining the reticular nodes relation.

The drawing of FIG. 6 illustrates an example which defines the reticular node relation. Each point represents a node. The description of reference numerals of FIG. 6 follows: a node 601 corresponding to the server 104; nodes 602 corresponding to base stations (mobile subnets); and nodes 603 corresponding to mobile terminals.

The node 601 corresponding to the server is configured to perform the data synchronization with the nodes 602 corresponding to the base stations. Also, the nodes 602 corresponding to the base stations are configured to perform the data synchronization with the nodes 603 corresponding to the mobile terminals.

The node 601 corresponding to the server periodically requests for data synchronization to the nodes 602 corresponding to the two base stations. A node 602 corresponding to each base station receives the data synchronization request and updates the shared data. The node 602 corresponding to each base station, after completing the data synchronization process it has received, requests for a successive data synchronization to the nodes 603 corresponding to the plurality of mobile terminals inside each cell. The node 603 corresponding to each mobile terminal receives the data synchronization request and updates the shared data. By doing so, the replicated and shared data is maintained consistent at each one of the nodes.

In the present embodiment, there are cases when the data updating conflicts, however, it is possible to recover the consistency of the shared data which is replicated at each node. At any one node, if the data updating does not occur, the consistency of shared data can be recovered for all of the nodes by executing the data synchronization at least two times.

Embodiment 2

The data communication among the nodes 602 corresponding to the base stations and the nodes 603 corresponding to the mobile terminals as described in the embodiment 1 uses a CDMA wireless communication which is controlled by the CDMA driver 309. The mobile terminals 101 have chip sequences corresponding to their own telephone numbers. The base station 102 calls each mobile terminal 101, and after the call is connected, the data communication is performed by using the given chip sequence. As regard to the CDMA wireless communication by the CDMA, the communication data is expressed by the chip sequence and its 2's complement. In order to protect the communication from a danger of tapping, a content of the communication is encrypted and decrypted by a data-encrypting key.

In the present embodiment, each node sharing the data already stores the data-encrypting key in the media access control unit 307. If a node is on a transmitting side of the CDMA wireless communication, the data-encrypting key is given by the media access control unit 307, and the communication data is encrypted by using the given data-encrypting key. If a node is on a receiving side of the CDMA wireless communication, the data-encrypting key is given by the medium access control unit 307 and the communication data is decrypted by using the data-encrypting key.

If a node is on a receiving side of the CDMA wireless communication, the node monitors the chip sequence of all the bands, and attempts decryption of all of the communication by the chip sequences, which is newly detected. The data-encrypting key given by the media access control unit 307 is used for this decryption.

Within a decrypted data, if a key which indicates that it is a communication data for the data synchronization process is detected, then the decrypted data is handed over to the datagram transport 305 of higher hierarchy. The previously described key, for example, is a code such as "shared store 012000259" which is a text column specifying the data store 302. With such operation, one mobile terminal can monitor a communication of another mobile terminal which shares the data with one mobile terminal, thereby one mobile terminal can incorporate the data of the communication into itself. Namely, one mobile terminal can intercept the communication of another mobile terminal.

Figure 7:
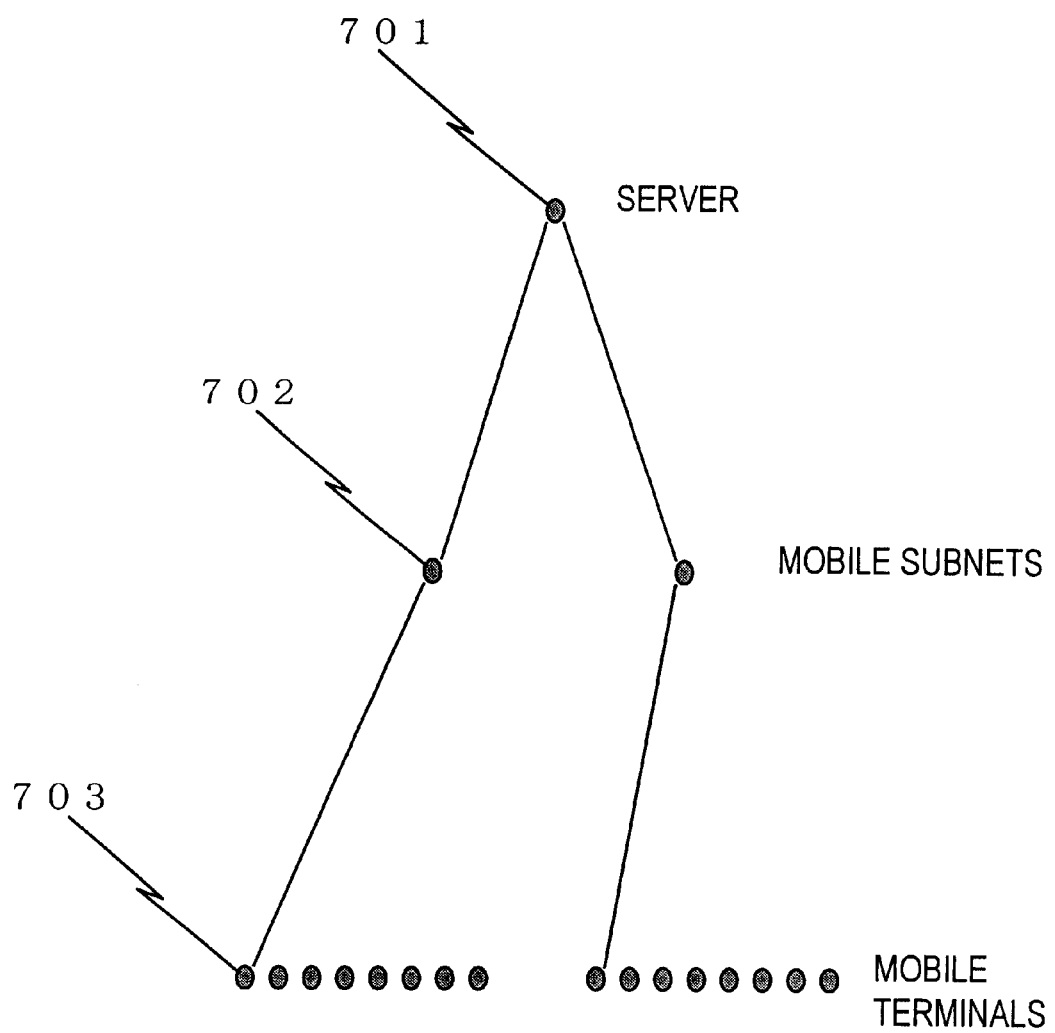
FIG. 7 illustrates an example defining the node relation in case of using the interception mechanism.

The drawing of FIG. 7 illustrates an example of relations among the nodes which intercept the communication with each other by using the previously described interception mechanism. The reference numerals indicated in the drawing of FIG. 7 are as follows: a node 701 corresponding to the server 104; nodes 702 corresponding to the base stations (mobile subnets); nodes 703 corresponding to the mobile terminals.

In the case of embodiment 1, the node 602 corresponding to each base station has transmitted a data synchronization request successively to the nodes 603 corresponding to a plurality of mobile terminals in each cell when the node 602 has completed the data synchronization process it has received. However, in the embodiment 2, the node 702 corresponding to each base station requests the data synchronization only to the node 703 corresponding to a single mobile terminal which is selected from a plurality of mobile terminals inside the cell when the node 702 has completed the data synchronization process it has received. The node 703 corresponding to another mobile terminal inside the same cell intercepts a communication of the data synchronization of selected mobile terminal, and incorporates the update message if it is applicable.

Figure 8:
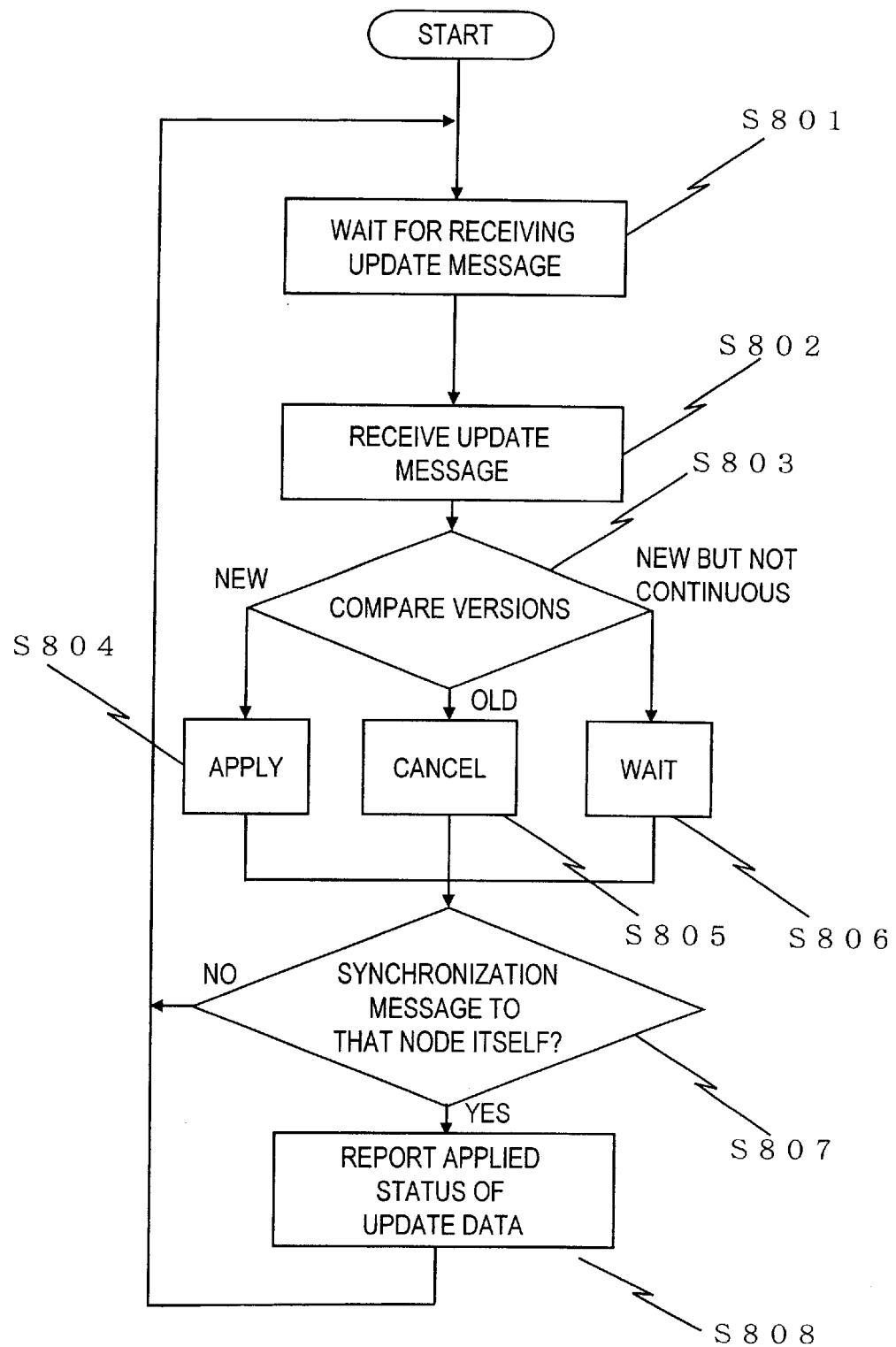
FIG. 8 illustrates a data flow chart of the updating the shared data and receiving the data synchronization request.

The drawing of FIG. 8 illustrates a data flow of the processes including waiting of the data synchronization request and updating of the shared data. The node waits for the update message 403 in step S801. This waiting includes the interception. If the update message 403 is received in step S802, then instep S803, the node compares the log number of the update message 403 and the log number of replicated data being managed in the node. If the log numbers of the update message 403 is newer by one version, then in step S804, the update data is incorporated into the data of the node. In other words, the shared data is updated. At this time, it is updated by adding an entry of the update log data 402 of the data store 302. If a version of the update message 403 is older, then the updating is not applicable, therefore, the update message 403 is cancelled in step S805. If the update message 403 is newer by more than two version, the update data cannot be applied directly but can be stored as the differential data. A transmission of a lost version of the update message 403 is requested to the node 702 corresponding to the base station, and the data consistency is recovered by applying the stored differential data together with the differential data obtained through the transmission request of the lost version.

In step S807, the node checks the update message 403 to see whether the message is addressed to the node, and if it find the message is addressed to the node, then in step S808 reports the status of applying update data to its source of transmission. If the node finds the update message is not addressed to the node, the status of applying update data is not reported to the source of transmission since the data obtained by the interception is available. However, even in a case of no reporting the status of applying update data, the data consistency can be maintained by requesting for data synchronization from the node intercepts.

In the embodiment 1, the data synchronization processes is implemented at all the nodes within the same cell, however, in the embodiment 2, the data synchronization process is implemented at only one selected node, and another node intercepts the message of the data synchronization and carries out the data synchronization. Accordingly, this can prominently reduce the communication traffic involved in the data synchronization process.

Following description is an operation when the shared data is updated at the node 703 corresponding to the mobile terminal inside the cell. The node 703 corresponding to the mobile terminal where the data is updated attempts to request for the data synchronization to the node 702 corresponding to the base station. All the nodes related to the data synchronization mechanism of the present invention is same, therefore, the data synchronization request from the node 702 corresponding to the base station to the node 703 corresponding to the mobile terminal operates in a similar manner as the data synchronization request from the node 703 corresponding to the mobile terminal to the node 702. The node while intercepting the data synchronization communication message, does not request for the data synchronization at the same time. Such a control function works as a media access control inside the CDMA cell.

If the node 703 corresponding to the mobile terminal requests for the data synchronization, the nodes corresponding to another mobile terminals observe the issuance of this request and updates the shared data in accordance to the flow chart of FIG. 8 in a similar manner as the node 702 corresponding to the base station issuing the data synchronization request.

If the data synchronization request cannot be intercepted by the mobile terminal for some reason such as power cutoff and disturbances, the update log data 402 managed at a node that can not intercept becomes older compared to the update log data 402 managed at the other nodes inside the same cell. That is, the node that can not intercept loses the update data. This node knows that the update data has been lost from the log number of the update message the node receives afterwards, and therefore, the node must issue a request in order to obtain the lost update message. The node 702 corresponding to the base station transmits the update message 403 in a similar manner as a normal data synchronization process. After that, the status of applying update data is received after recovery, and registers it in a similar manner as the normal data synchronization process. Then, the data consistency can also be recovered by connecting to a certain node via modem and utilizing the wired communication.

Embodiment 3.

In the present embodiment, the present invention is applied to the communication media where all of the nodes are treated equally.

The communication media where all of the nodes are treated equally includes medium such as wireless LAN, wired LAN, IrDA (infrared data association) standard, and Bluetooth.

The present embodiment also uses a mobile terminal having the software configuration of FIG. 3. The wireless LAN controlled by the wireless LAN driver 308 and the media access control unit 307 is used in the data synchronization communication. Accordingly, it is a prerequisite of the other node subjected to the data synchronization to be providing the wireless LAN as the communication mechanism.

The wireless LAN is considered as a CDMA of fixed chip sequence. The wireless LAN implements a media access control of CSMA (carrier sense multiple access) type at the broadcasting type communication media. That is, the media is media access controlled so as to be always occupied by a single node, and so-called MAC address is supplied as an address, which identifies each node.

All the transmitting and receiving devices of the wireless LAN carrying out the data synchronization store the same data-encrypting key in the medium access control unit 307. The transmitting and receiving devices of the wireless LAN attempt to decrypt all of the received data regardless of the MAC address. Then they search the decrypted data for a key indicating a communication data for the data synchronization process. If the key is found, the decrypted data is handed over to the datagram transport 305 of higher hierarchy. By doing so, the data communication of another mobile terminals is monitored via the wireless LAN communication mechanism, and the communication data can be incorporated.

In case of transmitting the communication data for the data synchronization process without encrypting it, there is no need for a decryption process by the receiving device, and it is possible to decide whether it is the communication data for the data synchronization process simply by searching process of the previously described key.

Figure 9:
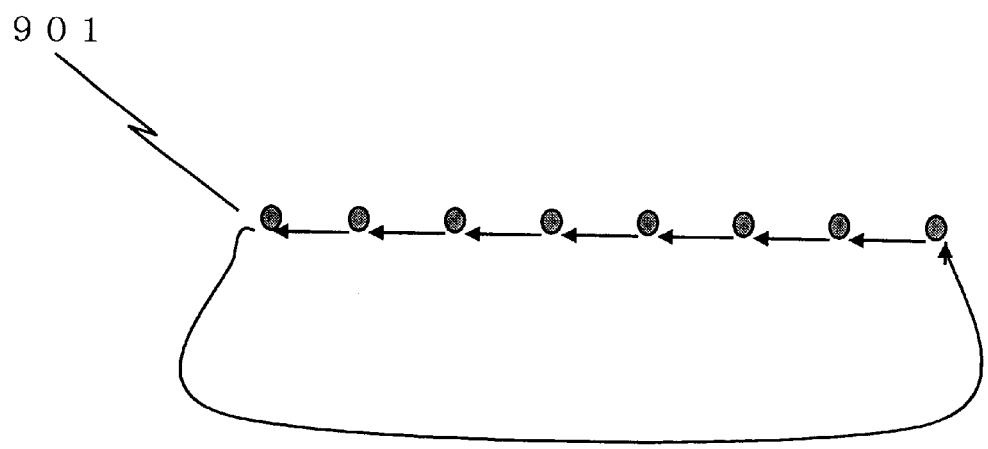
FIG. 9 illustrates an example defining the ring nodes relation.

The drawing of FIG. 9 illustrates an example which defines the ring form node relations. The reference numeral 901 indicates nodes corresponding to the transmitting and receiving devices of the wireless LAN. It is configured to performs the data synchronization among the nodes 901 corresponding to the transmitting and receiving devices of the wireless LAN, and further perform the data synchronization between the node of higher hierarchy and a node 901 corresponding to one of the transmitting and receiving devices of the wireless LAN. The node of higher hierarchy is, for example, a node 701 corresponding to the server 104 illustrated in the drawing of FIG. 7.

In the data synchronization mechanism by the wireless LAN, since all the transmitting and receiving devices of the wireless LAN are equal, therefore, a relation among the nodes, for the data synchronization, is defined, as illustrated in FIG. 9. As can be seen in the drawing, the data synchronization request is issued from a source node to the next node indicated by an arrow. The node which updated its data issues the data synchronization request following this relation. Similar to the embodiment 2, the other nodes monitor the communication data for the data synchronization process, and incorporate the communication data. This process of the data synchronization between one to one node relation is applied to all other nodes.

Figure 10:
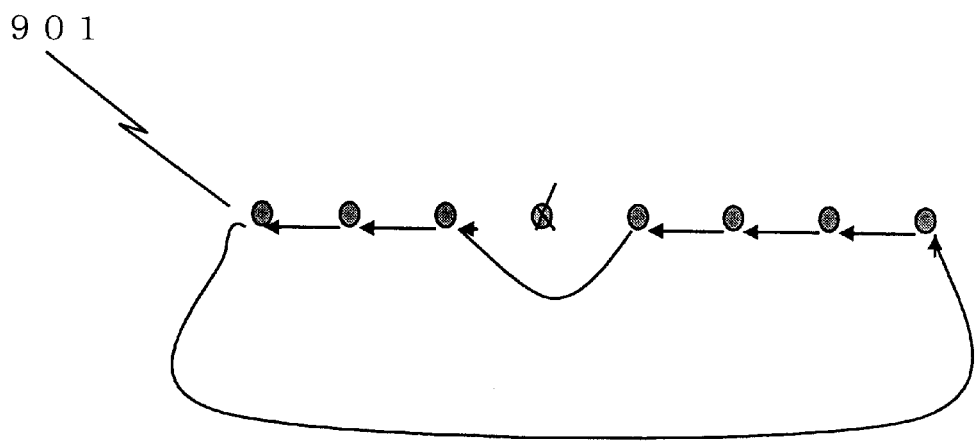
FIG. 10 illustrates a relation of the data synchronization request when communication unable.

The node 901 corresponding to the transmitting and receiving devices of the wireless LAN may have some kind of disturbances or may become communication unable due to the disturbances. The drawing of FIG. 10 illustrates a relation of the data synchronization request in case of communication unable. In the case of communication unable, as illustrated in FIG. 10, the data synchronization request is transmitted to the node next to the one in trouble, in accordance with a definition of the node relation illustrated in FIG. 9. In order for recovering a lost update data, a request for transmitting the update data is issued in accordance with the node relation illustrated in FIG. 9.

However, definition of the node relation of FIG. 9 is only one example for specifying the other nodes which receives the request for the data synchronization. That is, it is possible to update the shared data of all the nodes, by issuing data synchronization request from any node in this ring form to any other nodes. This is because the other nodes intercept the data synchronization request.

The present invention, for example, can be applied to business activities where sales persons in charge of a specific region assemble a team. The representative of the team executes a data synchronization before commencing the business operation, and calls up a business data to his mobile terminal from the database of the intranet. Next, the other sales person executes the data synchronization and reads the business data into their respective mobile terminal from the representative's mobile terminal. Each sales person performs business activities based on the business data. The update of the business data which has been amended by the business activities successively reflects the mobile terminal of all the sales persons. Also, after the completion of business activities, by executing the data synchronization by the representative once more, the result of business activities can be compiled to reflect on the intranet database.

Embodiment 4.

In the previously described embodiments, the data consistency is maintained by storing the update log data and the differential data, and by exchanging the update message 403. However, under this method, there may be a node which has not received the latest differential data, or the conflict in the updated data may happen.

Also, the update log data and the differential data are no longer required when they are distributed to all the nodes sharing the data, however, these data must have been stored by a node during a course of the distribution to the other nodes. Particularly, in case of frequent updatings, the amount of stored data gets large. Although this may be temporary, storing such a large amount of update log data and the differential data is a burden especially at a mobile terminal having only a small resource.

In the present embodiment, how a session is created among each node, and how to distribute the differential data evenly are described. The configuration described in the embodiment 3 is taken as an example.

First of all, the node which is going to update the data transmits a message of declaring data sharing. The message, specifying the MAC address, is transmitted either to one of the nodes, or is transmitted to the broadcast address prepared by the MAC. The drawing of FIG. 19 illustrates an example of the message of declaring data sharing. This message declares a validity of the data synchronization protocol which controls creating and storing of the update log data and the differential data.

The mobile terminal which has received this message, saves the log number that should be adopted next, and moves to "mode of declaring data sharing". The node which has lost the update data of a certain version cannot participate in the session of declaring data sharing. In such cases, the node moves to "waiting mode " and stops the issuance of the data synchronization request. By doing so, each mobile terminal moves either to "mode of declaring data sharing" or to "waiting mode".

Figure 11:
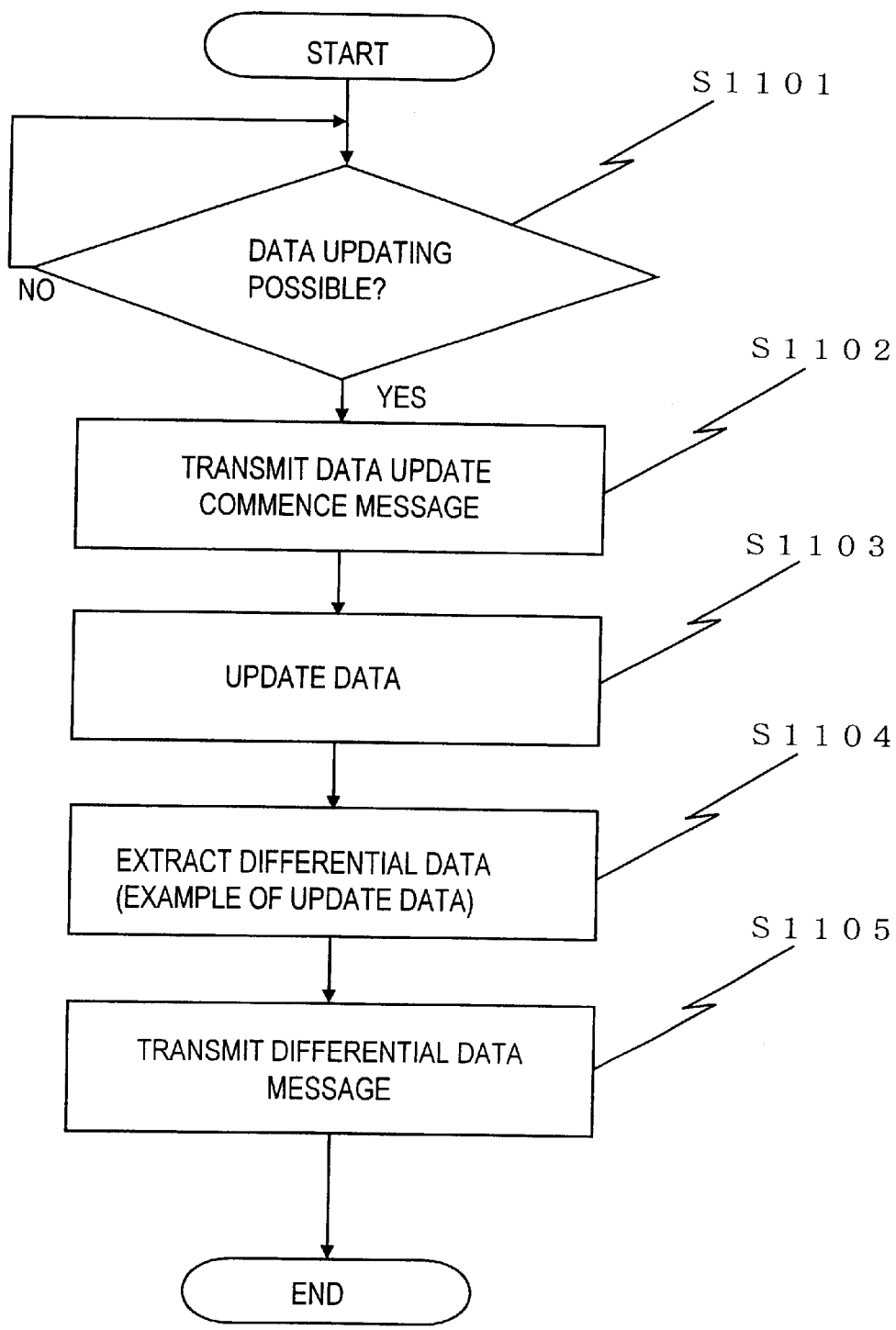
FIG. 11 illustrates an update message transmitting algorithm during the mode of declaring data sharing.
Figure 12:
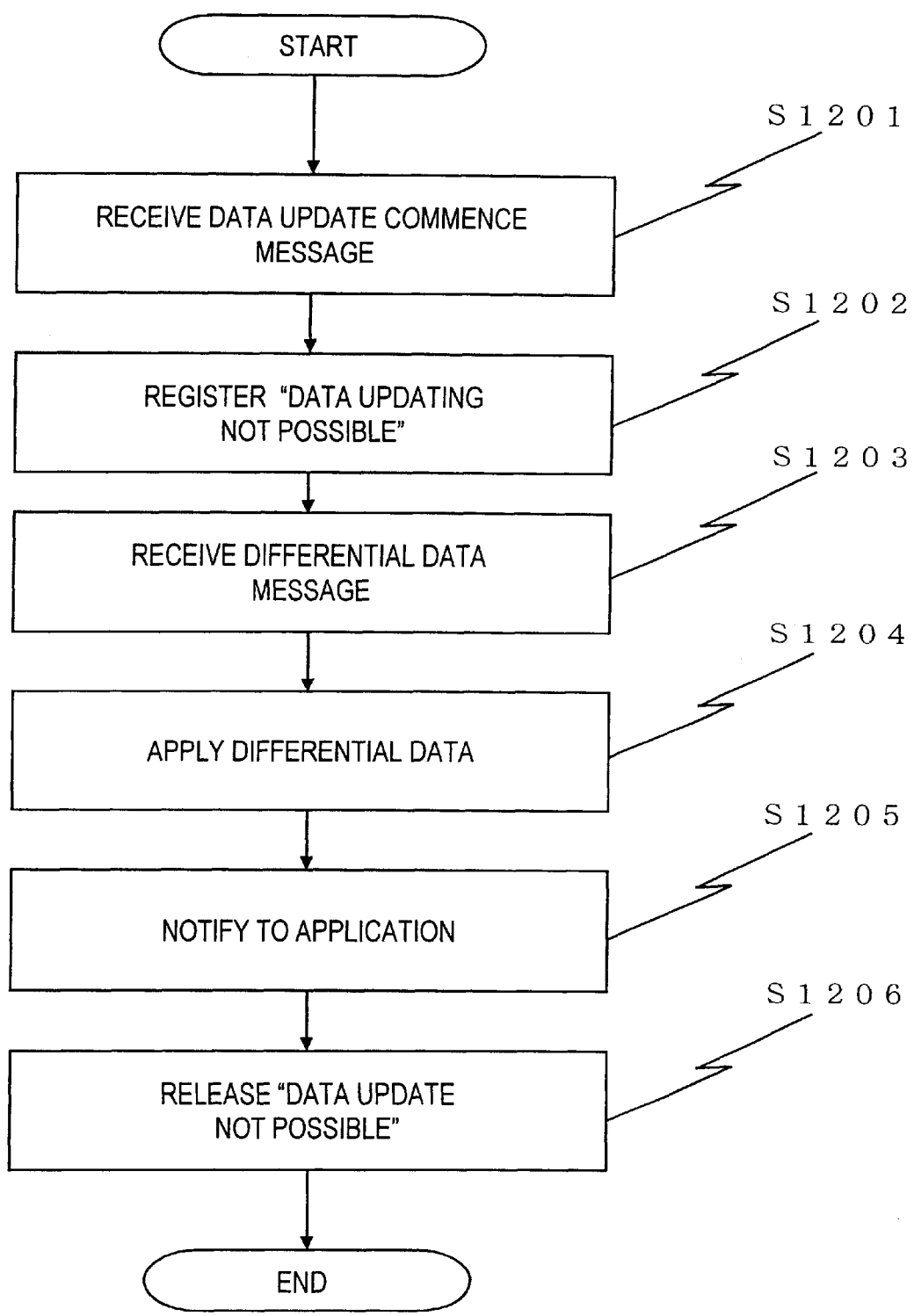
FIG. 12 illustrates an update message receiving algorithm during the mode of declaring data sharing.

The mobile terminals that have moved to the "mode of declaring data sharing" establish the session of declaring data sharing. The drawing of FIG. 11 illustrates an update message transmission algorithm during the mode of declaring data sharing. The drawing of FIG. 12 illustrates an update message reception algorithm during the mode of declaring data sharing. By using these algorithms, updating of the shared data is performed among the nodes in the session of declaring data sharing.

In step S1101, the transmitting node (i.e. the node on the transmitting side) which is going to perform the data update checks whether another node is in the process of data updating or not. If none of the other nodes is engaged in the data updating process, then in step S1102, a data update commencement message is transmitted. If any other node happens to be engaged in the data updating process, then the transmission from the transmitting node is not implemented and the transmitting node performs a retry of the data update check. The drawing of FIG. 20 illustrates an example of the data update commencement message.

When the receiving node (i.e. the node on the receiving side) receives this data update commencement message in step S1201, then register a fact that the data update is not possible in step S1202, and deters the data update from itself. If the node of mobile terminal, that does not receive the message of declaring data sharing, has receives the data update commencement message, move to the "waiting mode" and deters the data update from its node similarly.

The transmitting node updates data in step S1103, extracts the differential data in step S1104, and transmits the differential data message in step S1105. The drawing of FIG. 21 illustrates an example of the differential data message.

The receiving node receives this differential data message in step S1203, and applies the differential data in step S1204. At this time, a new entry is not added to the update log data 402 inside the data store 302. In step S1205, the receiving node notifies that the data is updated to the application program 301, and release the determent of the data update in step 1206.

While the mode of declaring data sharing is valid, each node repeats the processing of FIG. 11 as the transmitting node, and repeats the processing of FIG. 12 as the receiving node.

Releasing of the mode of declaring data sharing is performed by transmitting the message of releasing the mode of declaring the data sharing by the node which has declared data sharing. The drawing of FIG. 22 illustrates an example of the message of releasing the mode of declaring the data sharing.

The node which was in the session of declaring data sharing, or in other words, the node which has released the mode of declaring data sharing, and the other nodes which have received the message of releasing the mode of declaring data sharing, extract the differential data between the shared data at a time of commencing the session of declaring data sharing and the shared data at a time of completing the session of declaring data sharing. Further, the nodes create the log number by using a method of reading the saved log number or by using some other method, and add a new entry to the update log data 402 of the data store 302. The mode of declaring data sharing is released accordingly.

Also, all the other nodes in the "waiting mode" releases the "waiting mode". The node, that could not participate in the session of declaring data sharing, can recover the data consistency by using the method illustrated in the embodiment 3.

Accordingly, with this embodiment of the present invention, the amount of information of the update log data stored at each node decreases, also it is secured to share the latest information between the nodes configuring the session. Such that an efficiency of data sharing within the broadcasting type communication mechanism is further improved.

Embodiment 5.

Figure 13:
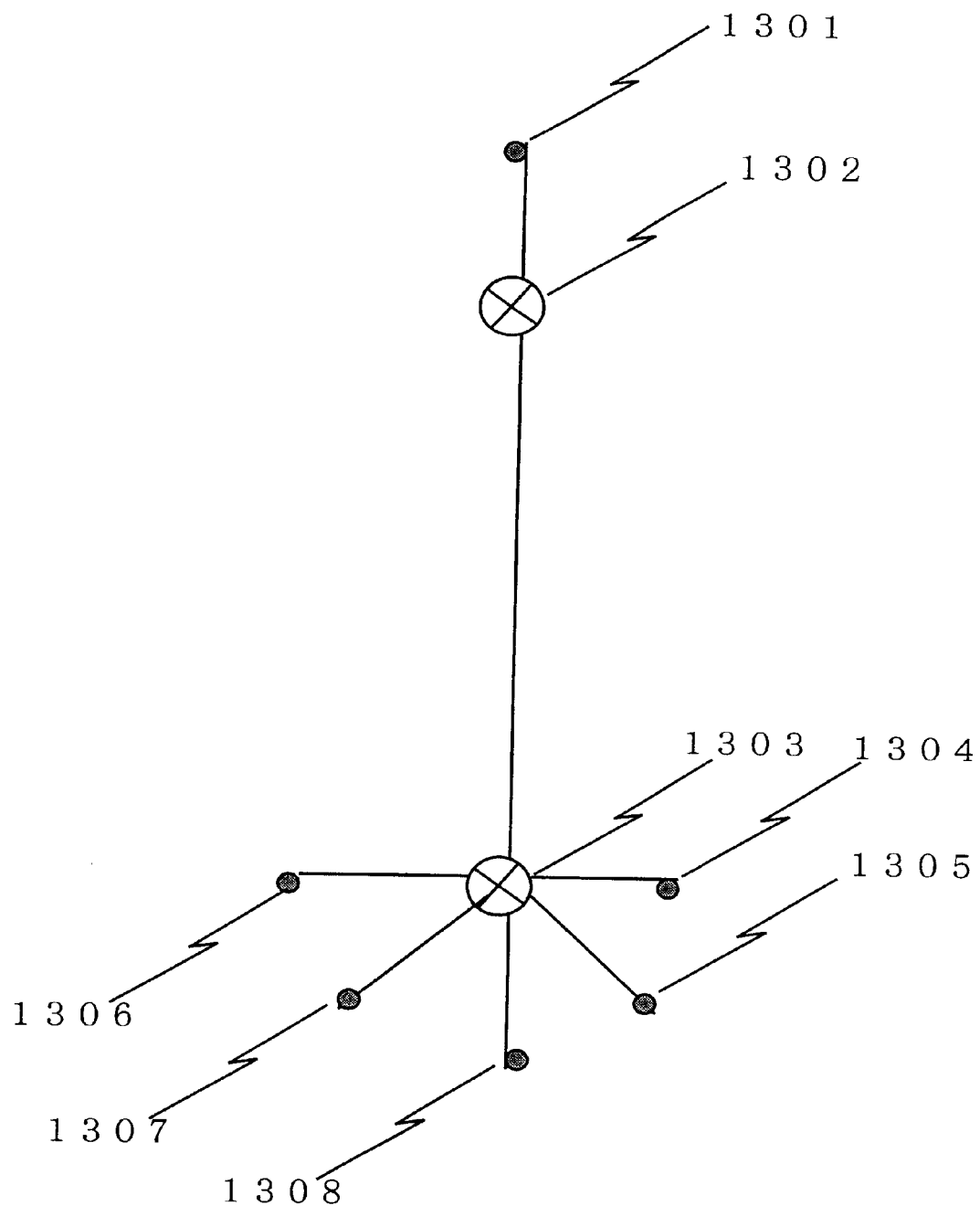
FIG. 13 illustrates a node configuration which performs the data synchronization by using the multicast type communication mechanism.

The present embodiment describes an embodiment which uses the communication mechanism that supplies a multicast type communication. The drawing of FIG. 13 illustrates a configuration of node performing the data synchronization process using the multicast type communication mechanism. The description of reference numerals of FIG. 13 follows: a node 1301; ATM exchanges 1302 and 1303; and the remaining nodes 1304 to 1308. The ATM exchanges 1302 and 1303 are used in exchanging data between the base station controller 106 and the base station exchange 107 illustrated in FIG. 1.

The node 1301 receives the data exchanging service by connecting to the ATM exchange 1302. The nodes 1304 to 1308 receive the data exchanging service by connecting to the ATM exchange 1303.

Figure 14:
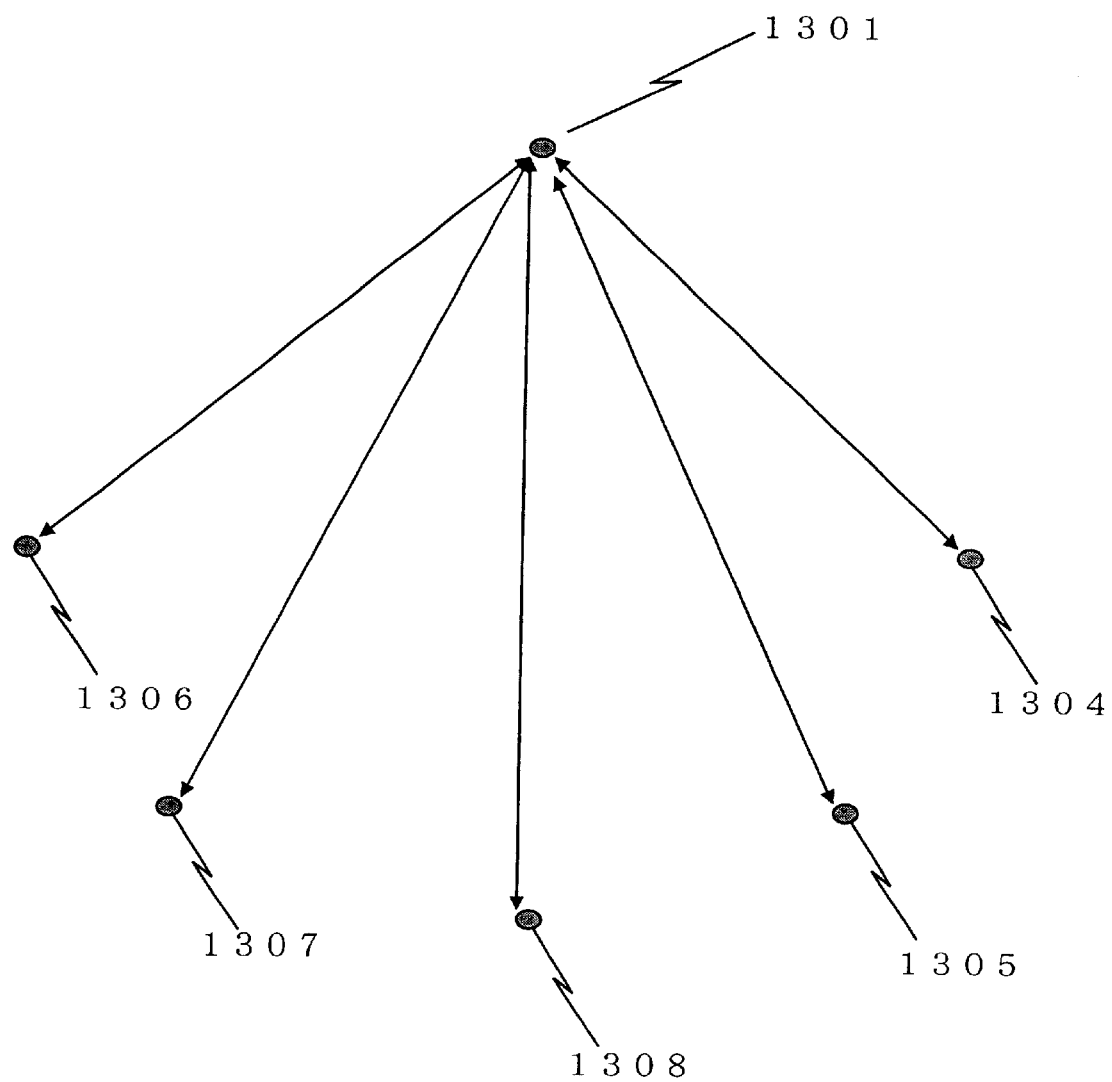
FIG. 14 illustrates a multicast route.

The ATM exchanges 1302 and 1303 can set a fixed type multicast route. In the present embodiment, a route shown in FIG. 14 is set up. Transmission from the node 1301 to each of the nodes 1304 to 1308 is possible in either way of a multicast or an individual transmission. Transmission from each of the nodes 1304 to 1308 to the node 1303 is also possible.

A multicast message is copied and the copies are distributed by the ATM exchange 1303, therefore, compared to the way of using the individual transmission, the way of the multicast reduces a traffic on a bus between the ATM exchanges 1302 and 1303 down to ⅕. This effect will further be prominent if the number of nodes increases for multicast.

Figure 15:
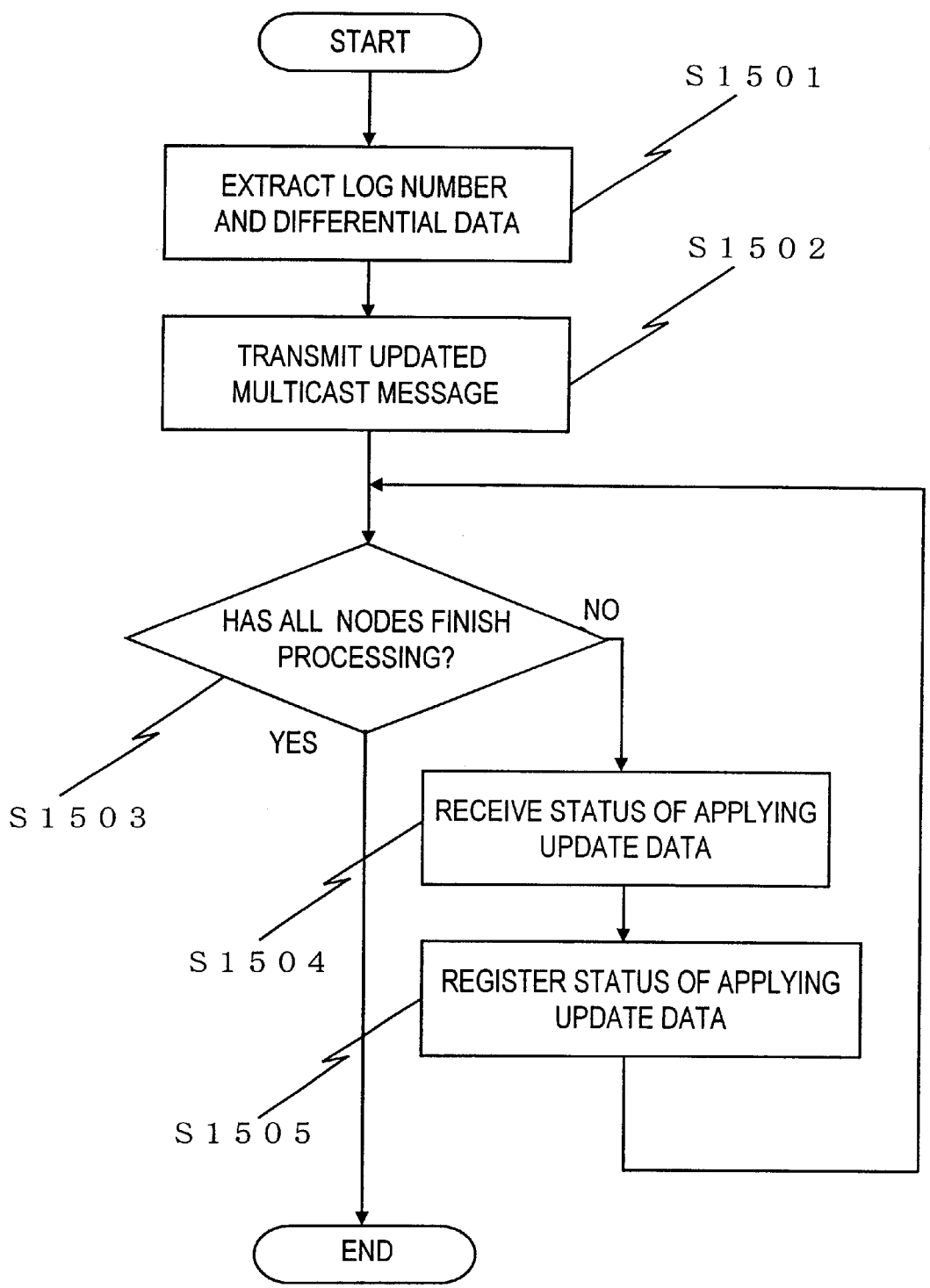
FIG. 15 illustrates an algorithm using the multicast communication.

If the data is updated at either one of the nodes 1304 to 1308, then this node executes the data synchronization to the node 1301 in a similar manner as the embodiment 1. However, the node 1301 can accept only one data synchronization execution at a time. If it occurs that the execution of the data synchronization from either one of the node 1304 to 1308, or that the data updating at the node 1301, then the node 1301 executes data synchronization based on a logic shown in FIG. 15. The operation of receiving the data synchronization at each node of 1304 to 1308 is executed in the same manner as the logic used by the right hand side of FIG. 5. The process of FIG. 15 is performed following the update message reception and shared data update by another node, or shared data update by the node itself.

The update log data and differential data of the latest update are extracted in step S1501. In step S1502, the update data is transmitted by a means of multicast to the nodes 1304 to 1308.

Each node performs a process of receiving the data synchronization request in a similar manner as the embodiment 1, and reports the status of applying update data to the node 1301. In step S1504, the node 1301 receives the report of the status of applying update data, and in step S1505, registers the status of applying update data of each node, and in step S1503 completes these process for all the nodes. At a node which has lost in a competition for the data synchronization to the node 1301, the conflict in the data update comes up. The losing node absorbs the conflict, and executes the data synchronization once again to the node 1301 if necessary.

Embodiment 6

Figure 16:
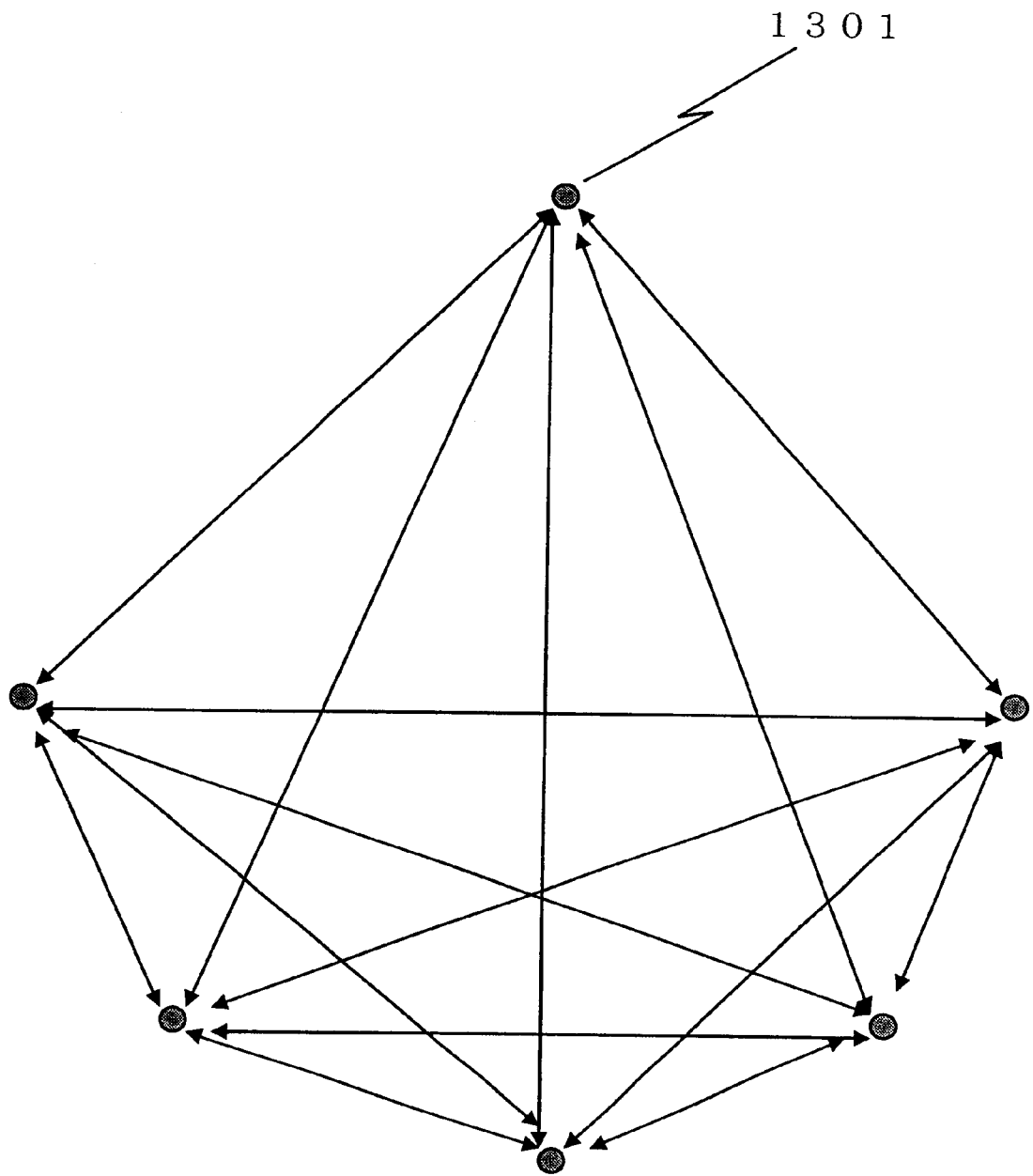
FIG. 16 illustrates the multicast route from all the nodes.
Figure 17:
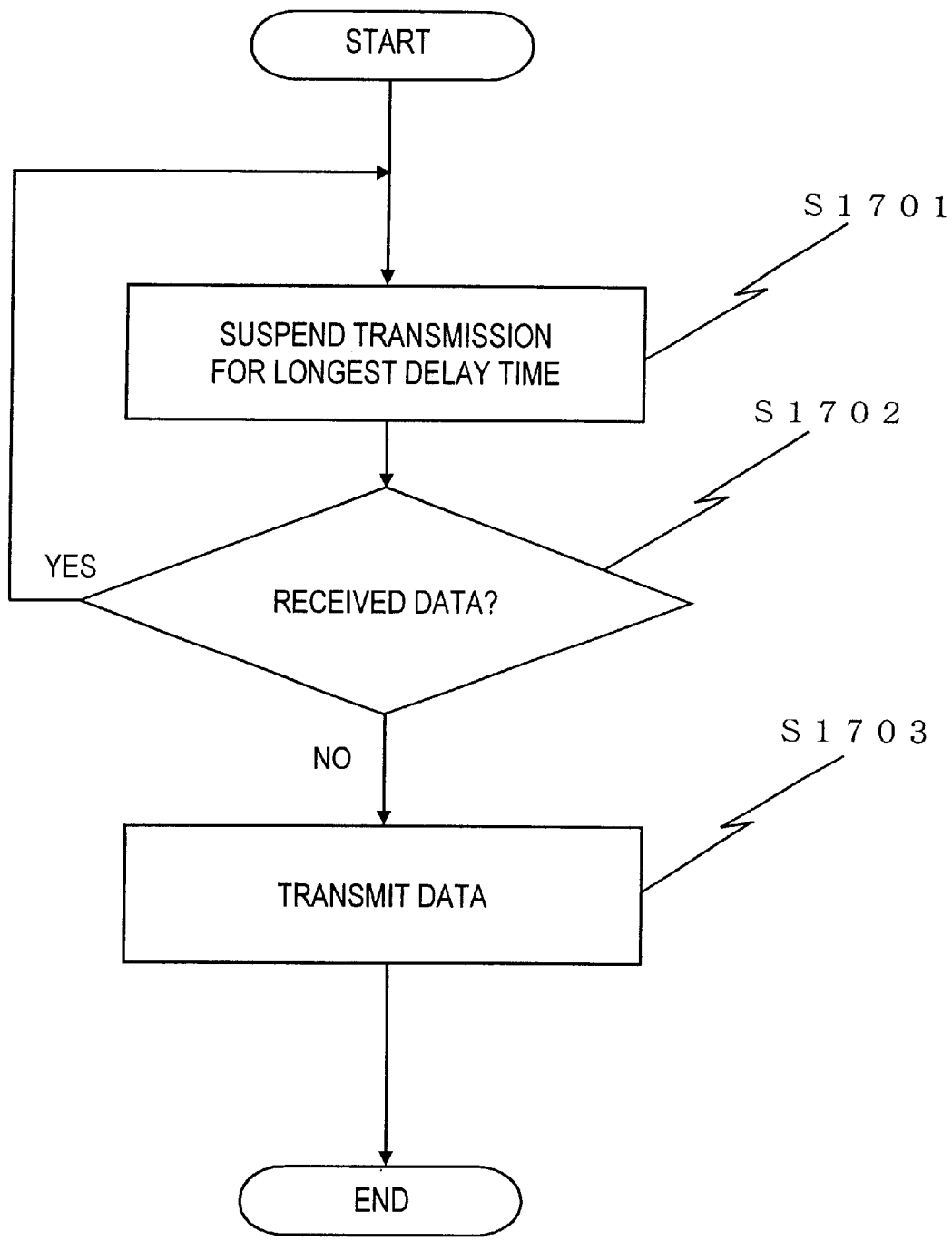
FIG. 17 illustrates a flow chart of media access control process.

Further, in this embodiment, by installing a route, all of the nodes can transmits in multicast to all other nodes as illustrated in FIG. 16. By doing so, this multicast technique gives almost same effect as the broadcast type. Under such a multicast environment, the media access control unit 307 performs the media access control processing. The drawing of FIG. 17 illustrates a flow chart of the media access control process. This process is executed at a time of transmitting the multicast data. When there is a request to transmit the multicast data, then in step S1701, the media access control unit suspends a data transmission for a time equivalent to the longest delay throughout the whole communication path, and in step S1702 investigates whether the node receives a data or not, eventually with no data received it transmits the data in step S1703. If the node receives the data, the media access control unit repeats the suspension for the time equivalent to the longest delay.

Note that the time for the suspension is preliminarily measured and registered beforehand.

Based on the previously described mechanism, the multicast type communication mechanism can be handled equally as the broadcasting type communication mechanism installing the media access control, and adopts the same shared data updating mechanism as in the embodiment 4. The node 1301 manages the installation of the route, and performs the declaration of the data sharing and the declaration of releasing data sharing. If the data synchronization is required between a node inside a data cluster sharing the data based on the declaration of data sharing, and another node outside the cluster, the synchronization is performed after releasing the session of declaring data sharing. In case where a control on the issurance of the update log and differential data and a quickness of data synchronization are regarded important, then the declaration of data sharing is performed and the session of declaring data sharing of the present embodiment is carried out.

Embodiment 7

When the mobile terminal having the software configuration of FIG. 3 is powered on, two contexts, which are waiting for the data update in the wireless LAN interface and CDMA interface, becomes ready and move to the listening modes, respectively. These two contexts are controlled by an exclusive control flag, not to execute the data updating at the same time. For example, if both the update message from the CDMA interface and the update message from the wireless LAN interface become waiting mode, then the update message from the wireless LAN interface is prioritized by following the exclusive control flag.

Also, as described in the embodiment 4, the declaration of data sharing is prioritized at the wireless LAN.

Effects of the Invention

As for the data communication among the nodes sharing, managing and maintaining the replicated data, an amount of communication traffic can be lessened by utilizing the attributes of the communication media. The wireless communication used in the mobile type communication network is preferable communication media to the broadcasting type communication. The amount of traffic is reduced by utilizing advantages of such broadcasting type communication. Also, for the wired communication, the amount of traffic is reduced by using the multicast communication.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data communication device connected to a communication mechanism which connects to another data communication device, comprising:

a shared data storing unit for storing a shared data replicated and managed by the data communication device and the another data communication device;

a shared data updating unit for updating the shared data stored in the shared data storing unit;

a version managing unit for storing and managing a version of the shared data;

a version communication unit for communicating the version of the shared data by using the communication mechanism;

an update data communication unit for communicating a update data which is a differential data between the shared data before updating and the shared data after updating by using the communication mechanism;

wherein the data communication device executes a plurality of processes as a transmitting side data communication device when the shared data updating unit updates the shared data stored in the shared data storing unit (case (1)), the plurality of processes includes a process A by the version managing unit, for creating the version of the shared data updated by the shared data updating unit and storing the created version;

a process B by the version communication unit, for transmitting the version stored in the version managing unit; and a process C by the update data communication unit, for transmitting the update data which is a differential data between the shared data before updating and the shared data after updating;

wherein the data communication device executes a plurality of processes as a receiving side data communication device when the another data communication device updates the shared data stored in the another data communication device (case (2)), the plurality of processes includes:

a process D by the version communication unit, for receiving the version transmitted from the another data communication device;

a process E by the update data communication unit, for receiving the update data transmitted from the another data communication device;

a process F by the version managing unit, for deciding whether to apply the update data based on the version stored in the version managing unit and the version received by the version communication unit, and for storing the received version when the version managing unit decides to apply the update data;

a process G by the shared data storing unit, for storing the update received data when the version managing unit decides to apply the update data.

2. The data communication device according to claim 1, wherein the data communication device executes a process H by the version communication unit, for transmitting the version stored in the version managing unit, in the case (2), in addition to the processes of D to G, as the receiving side data communication device, wherein the data communication device executes a process I by the version communication unit, for receiving the version of the shared data transmitted by the another data communication device, and a process J by the version managing unit for storing the version of the shared data received by the version communication unit with an identification information of the another data communication device, in the case (1), in addition to the process of A to C, as the transmitting side data communication device.

3. The data communication device according to claim 1, wherein the data communication device stores identification information of the another data communication device and identifies the another data communication device by the stored identification information, wherein the version communication unit as a part of the transmitting side data communication device transmits the created version to the identified another data communication device in the process B when the shared data updating unit updates the shared data stored in the shared data storing unit in the case (1), and wherein the update data communication unit as a part of the transmitting side data communication device transmits the update data to the identified another data communication device in the process C when the shared data updating unit updates the shared data stored in the shared data storing unit in the case (1).

4. The data communication device according to claim 1, wherein the version communication unit as a part of the receiving side data communication device intercepts the version transmitted from the another data communication device in the process D when the another data communication device updates the shared data stored in the another data communication device in the case (2), and wherein the update data communication unit as a part of the receiving side data communication device intercepts the update data transmitted from the another data communication device in the process E when the another data communication device updates the shared data stored in the another data communication device in the case (2).

5. The data communication device according to claim 1 further comprising a mode controlling unit for switching to a mode of declaring data sharing and a data update commencement message communication unit for communicating a message for commencing data update by using the communication mechanism, wherein the data update commencement message communication unit as a part of the receiving side communication device executes a process of transmitting the message for commencing data update when the shared data updating unit updates the shared data stored in the shared data storing unit in the mode of declaring data sharing, wherein the version managing unit omits the process A of creating the version of the shared data updated by the shared data updating unit and storing the created version and the version communicating unit omits the process B of transmitting the version stored in the version stored in the version managing unit when the shared data updating unit updates the shared data stored in the shared data storing unit in the mode of declaring data sharing in the case (1), wherein the shared data updating unit as a part of the receiving side communication device by itself stops updating the shared data stored in the shared data storing unit when the data update commencement message communication unit receives the message for commencing data update in the mode of declaring data sharing, wherein the version communication unit omits the process D of receiving the version transmitted from the another data communication device and the version managing unit omits the process F of deciding whether to apply the update data and storing the received version when the another data communication device updates the shared data stored in the another data communication device in the mode of declaring data sharing in the case (2), wherein in the process G the shared data storing unit all the time stores the update data received when the another data communication device updates the shared data stored in the another data communication device in the mode of declaring data sharing in the case (2), and wherein the version managing unit creates the version of the shared data updated and stores the created version when the mode controlling unit releases the mode of declaring data sharing.

6. The data communication device according to claim 1 further comprising a mode controlling unit for switching to a mode of declaring data sharing and a data update commencement message communication unit for communicating a message for commencing data update by using the communication mechanism, wherein the shared data updating unit as a part of the receiving side communication device by itself stops updating the shared data stored in the shared data storing unit when the data update commencement message communication unit receives the message for commencing data update outside the mode of declaring data sharing and, wherein the processes of D to G are not implemented when the another communication device updates the shared data stored in the another data communication device outside the mode of declaring data sharing.

7. The data communication device according to claim 1, wherein the communication mechanism connecting a plurality of other data communication devices have a multicast communication function, wherein the data communication device stores a identification information of the plurality of other data communication devices and identifies the plurality of other data communication devices by the stored identification information, wherein the version communication unit as a part of the transmitting side data communication device transmits in multicast the created version to the plurality of identified other data communication devices in the process B when the shared data updating unit updates the shared data stored in the shared data storing unit, wherein the update data communication unit as a part of the transmitting side data communication device transmits in multicast the created update data to the plurality of identified other data communication devices in the process C when the shared data updating unit updates the shared data stored in the shared data storing unit, wherein the version communication unit receives the version of the shared data transmitted from the plurality of identified other data communication devices, and wherein the version managing unit stores the version of the shared data received by the version communication unit with the identification information of the plurality of other data communication devices which transmit the version.

8. The data communication device according to claim 7 further comprising a media access control unit for confirming no data received during a pre-determined time, wherein the version communication unit as a part of transmitting side data communication device transmits in multicast the created version to the plurality of identified other data communication devices after the media access control unit confirming no data received during the pre-determined time in the process B when the shared data updating unit updates the shared data stored in the shared data storing unit in the case (1), and wherein the update data communication unit as a part of the transmitting side data communication device transmits in multicast the update data to the plurality of identified other data communication devices after the media access control unit confirming no data received during the pre-determined time in the process C when the shared data updating unit of one data communication device updates the shared data stored in the shared data storing unit in the case (1).

9. The data communication device according to claim 1, wherein the communication mechanism connecting a plurality of other data communication devices have a multicast communication function, wherein the data communication device stores identification information of the plurality of other data communication devices and identifies the plurality of other data communication devices by the stored identification information, and wherein the data communication device further executes;

a process K by the version communication unit, for transmitting in multicast the version stored in the version managing unit to the plurality of identified other communication devices; and a process L by the update data communication unit, for transmitting in multicast the updated data stored in the shared data storing unit to the plurality of identified other communication devices.

10. The data communication device according to claim 1, wherein the communication mechanism includes more than two types of communication mechanisms, wherein the version communication unit can communicate the version of the shared data by using either one of more than two types of communication mechanisms, and wherein the update data communicating unit can communicate the update data by using either one of more than two types of communication mechanisms.

11. The data communication device according to claim 10, wherein the version communication unit and the update data communication unit selects a pre-determined communication mechanism, and communicate by using the selected communication mechanism.

12. The data communication device according to claim 5, wherein the mode controlling unit switches to a mode of declaring data sharing by linking with the another data communication device prior to the processes of the receiving side data communication device even if the another data communication device updates the data stored in the another data communication device.

* * * * *

UNITED STATES PATENT AND TRADEMARK OFFICE
CERTIFICATE OF CORRECTION

PATENT NO. : 6,389,423 B1
DATED : May 14, 2002
INVENTOR(S) : Takashi Sakakura

It is certified that error appears in the above-identified patent and that said Letters Patent is hereby corrected as shown below:

<u>Title page,</u>
Item [54], please correct the title from "DATA SYNCHRONIZATION METHOD FOR MAINTAINING AND CONTROLLING A REPLICATED DATA" to
-- DATA COMMUNICATION DEVICE --.

Signed and Sealed this

Nineteenth Day of November, 2002

*Attest:*

*Attesting Officer*

JAMES E. ROGAN
*Director of the United States Patent and Trademark Office*